United States Patent
Lesi et al.

(10) Patent No.: US 12,457,241 B2
(45) Date of Patent: Oct. 28, 2025

(54) PHYSICS-AWARE DETECTOR FOR PROTOCOL SPOOFING ATTACKS IN TIME SYNCHRONIZED NETWORKING

(71) Applicant: Intel Corporation, Santa Clara, CA (US)

(72) Inventors: Vuk Lesi, Cornelius, OR (US); Christopher Gutierrez, Hillsboro, OR (US); Shabbir Ahmed, Beaverton, OR (US); Marcio Juliato, Portland, OR (US); Manoj Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 18/090,410

(22) Filed: Dec. 28, 2022

(65) Prior Publication Data
US 2024/0223603 A1   Jul. 4, 2024

(51) Int. Cl.
*G06F 1/12* (2006.01)
*H04J 3/06* (2006.01)
*H04L 9/40* (2022.01)

(52) U.S. Cl.
CPC ............ *H04L 63/1466* (2013.01); *G06F 1/12* (2013.01)

(58) Field of Classification Search
CPC ... H04L 63/1466; H04L 63/1441; G06F 1/12; G06F 1/10; G06F 1/04; G06F 1/14
USPC ....................... 713/400–401, 500; 726/22–23
See application file for complete search history.

(56) References Cited

U.S. PATENT DOCUMENTS

| | | | | |
|---|---|---|---|---|
| 8,281,177 B2* | 10/2012 | Yajima | ................ | G05B 19/042 713/400 |
| 8,571,008 B2* | 10/2013 | Kim | ....................... | H04W 12/12 370/350 |
| 9,003,063 B2* | 4/2015 | Ree | ....................... | G01R 21/133 709/248 |
| 11,405,881 B1* | 8/2022 | Harris | ................. | H04W 56/003 |
| 12,120,212 B2* | 10/2024 | Lesi | ........................ | H04L 69/28 |
| 12,294,961 B2* | 5/2025 | Van Phan | ........... | H04L 41/0894 |
| 2009/0086764 A1* | 4/2009 | Lee | .......................... | H04L 69/28 370/503 |
| 2018/0262792 A1* | 9/2018 | Mackay | ................. | H04N 21/64 |
| 2023/0195161 A1* | 6/2023 | Shiga | ....................... | G06F 1/12 713/400 |
| 2023/0319746 A1* | 10/2023 | Hara | ........................ | H04L 7/00 370/350 |

* cited by examiner

Primary Examiner — Bharat Barot
(74) Attorney, Agent, or Firm — KDW FIRM PLLC

(57) ABSTRACT

Techniques include receiving a message with time information from a clock leader by a clock follower in a time-synchronized network (TSN), the time information to synchronize a clock to a network time for the TSN, retrieving an actual time offset value for the message, the actual time offset value to comprise a value between an actual sending time and an actual receiving time of the message, retrieving an estimated time offset value for the message, the estimated time offset value to comprise a value between an estimated sending time and an estimated receiving time of the message, the estimated time offset value generated using a physics-aware model of the TSN and a clock adjustment value for the clock based on the time information, and determining whether the time information for the message was modified to cause the clock to desynchronize based on difference information. Other embodiments are described and claimed.

20 Claims, 24 Drawing Sheets

PHYSICS-AWARE DETECTOR FOR PROTOCOL SPOOFING ATTACKS IN TIME SYNCHRONIZED NETWORKING

BACKGROUND

Many computing systems require real-time safety critical features. For example, many autonomous systems, industrial systems, etc., require such systems to have real-time safety-critical features. This often necessitates that timekeeping performance within the system has higher levels of security relative to other aspects of the system. For example, factories employ synchronized robots to accomplish coordinated tasks, often in the presence of human beings. In another example, robots utilize coordination to perform surgeries on humans. As yet another example, self-driving vehicles require synchronization of networked sensing elements to build a precise perception of the environment around the vehicle, including other vehicles, objects, hazards, and persons. Tools relied on to achieve the necessary time performance, synchronization, and bounded latency communication for such time sensitive systems to perform as needed is often referred to as time-synchronized networking.

In general, time-synchronized networking or time-sensitive networking defines a set of standards (and amendments) with the aim to enable time synchronization and deterministic data delivery in converged networks where time-critical (TC) traffic coexists with other types of traffic. Thus, there is a need to provide security for time-synchronized network devices to mitigate the risks associated with disruption in time-synchronized network operation from attacks on the timing of the network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
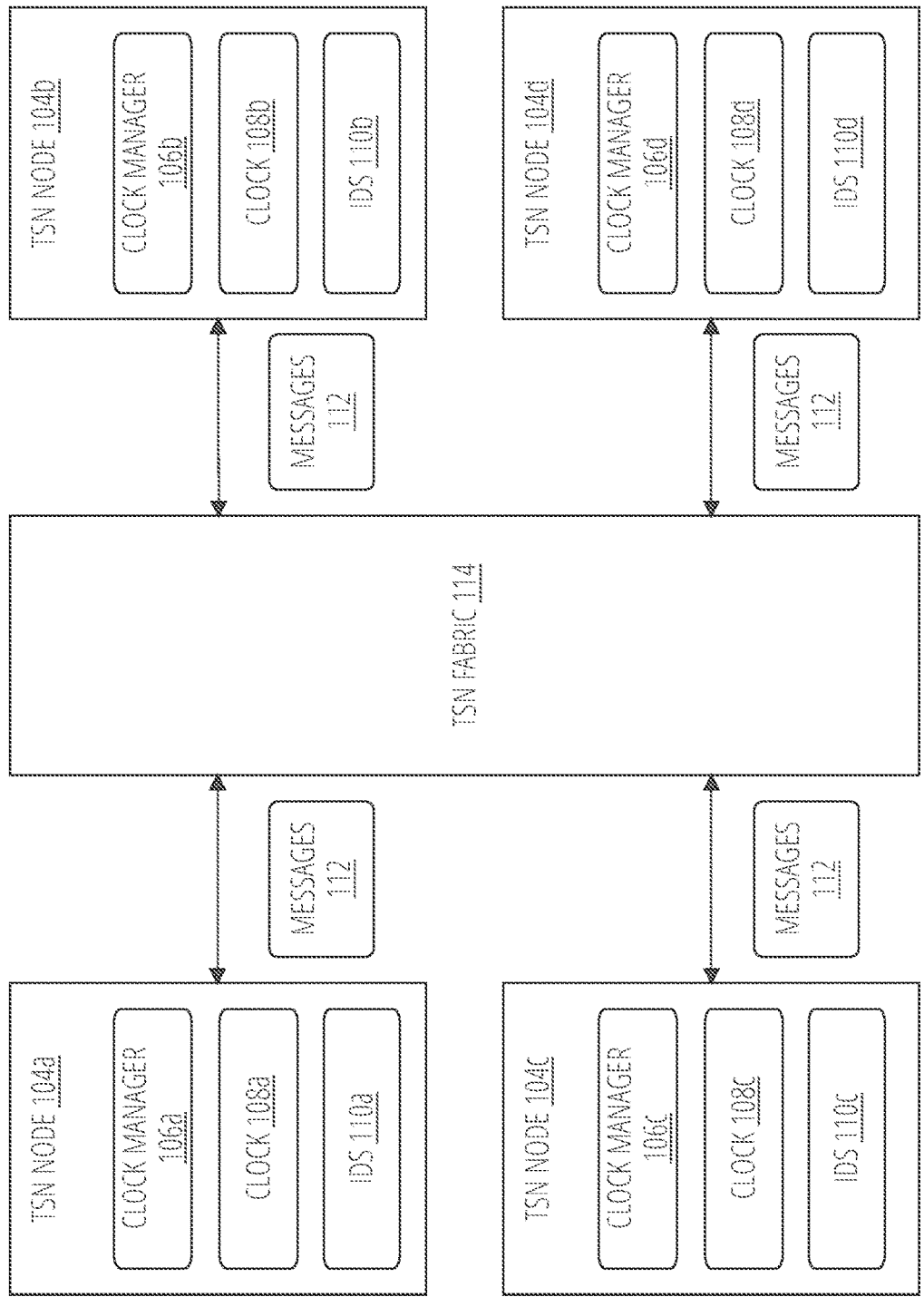
FIG. 1A illustrates an aspect of a time-synchronized network (TSN) 102 in accordance with one embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

The present disclosure is generally directed to time management and recovery techniques for systems operating on strict time requirements, such as systems based on time-synchronized networks (TSNs). As noted, TSN defines a set of standards (and amendments) with the aim to enable time synchronization and deterministic data delivery in converged networks where time sensitive traffic coexists with other types of traffic. Various standards have been developed to address time-synchronized or time-sensitive communications. By way of example and not limitation, some standards for enabling time-synchronized communications include those promulgated by the Institute of Electrical and Electronics Engineers (IEEE). For example, IEEE 1588, IEEE 802.1AS and IEEE 802.1Qbv provide systems and methods for synchronizing device clocks. In one example, IEEE 1588 defines a precision time protocol (PTP) for time synchronization across a network. In another example, IEEE 802.1AS defines a time-sensitive networking protocol referred to as a generic PTP (gPTP) for time synchronization across a network, where time sensitive devices (e.g., clock followers) synchronize to a leader clock (e.g., clock leader). In yet another example, IEEE 802.1Qbv defines time-sensitive networking profiles for industrial automation. Other examples include a network time protocol (NTP) which is a networking protocol for clock synchronization between computer systems over packet-switched, variable-latency data networks, network time security (NTS) which is a secure version of NTP, and other time-synchronized network protocols. Embodiments are not limited to these examples.

Time synchronization in a TSN requires tight software-hardware interplay. A device (or node) in a TSN may implement a clock manager as a software component and a hardware clock as a hardware component. The clock manager adjusts timing for the hardware clock to ensure synchronization with a common network time for the TSN. In one embodiment, for example, a precision time protocol (PTP) hardware clock (PHC) is periodically adjusted by a PTP for Linux (PTP4L) software module to account for time offset between a clock leader and a clock follower in PTP-synchronized nodes. When a software component receives incorrect time information, such as a time offset bias within messages carrying time synchronization information, the software can misconfigure or mis-control hardware for the PHC, thereby leading to incorrect timekeeping. For instance, attackers located external to a TSN-capable platform along a network path can tamper with messages carrying time information to synchronize the hardware clock. Examples include malicious switches and/or relays tampering with time-related messages, or external attackers injecting messages into the network, which ends up impacting a time of the nodes downstream. Consequently, system and applications depending on TSN capabilities will consume incorrect time. Accordingly, early detection of a corrupted messages and/or software components for a TSN node is critical within a TSN.

One conventional solution to address this problem is to implement an intrusion detection system (IDS) to monitor devices within a TSN to identify any abnormal behavior. An IDS implements software, firmware or hardware to support one or more specialized security functions, such as detecting malicious behavior caused by an attacker. The IDS may be implemented on a TSN node or separate from a TSN node. The IDS receives as input messages containing time information for synchronizing a clock of a TSN node with a network time for the TSN. The IDS analyzes the messages to detect anomalies, such as slight modifications to the time information to cause a TSN node to update an internal clock with a wrong network time. Incorrect time synchronization can cause disruptions in time sensitive applications executing on the TSN node, such as causing collisions between cooperative robotic arms or delaying braking in an autonomous vehicle. When the IDS detects abnormalities in messages carrying time information, the IDS generates an alert and takes action to isolate any affected TSN applications and/or TSN nodes from a compromised TSN node.

A challenge occurs, however, when an IDS has difficulty in identifying an attack in a timely manner. This challenge is made even more difficult when a source of the attack is of an unknown origin somewhere in a TSN. A TSN periodically sends messages with time information from a clock leader node to one or more clock follower nodes. Attackers positioned in a TSN between the clock leader node and the clock follower nodes, such as in switch nodes or relay nodes, may tamper with the time information carried by the messages. For instance, a malicious switch or relay may change timestamps carried by the messages in order to achieve clock drift of downstream clock follower nodes. In some cases, the tampering may be slight enough to evade detection by a conventional IDS.

To solve these and other challenges in a TSN, embodiments implement techniques to capture benign behavior of a time-synchronization process from a perspective of a TSN node within a TSN, such as from a clock follower node perspective in a TSN, for example. The captured data is used to build a physics-aware view or model of the time-synchronization process. The physics-aware model may incorporate modeling strategies to unlock monitoring of dynamical behavior of the time-synchronization process. The physics-aware model captures behavioral aspects of a TSN whose outputs depends on inputs over time, i.e., a stateful process. The behavioral data is then translated into model attributes in order to obtain accurate predictions or estimates of various phases of the time-synchronization process. The physics-aware model is constructed based on benign input/output data capturing various responses within a TSN based on excitations by capturing key dynamical responses features. An example response may include follower-to-leader time offset values for messages communicated within the TSN. An example of excitation may include clock adjustments, such as frequency or phase adjustments, made for a clock maintained by a clock follower node. An IDS may implement the physics-aware model, which may receive as input clock adjustments, generate estimated time offset values for one or more messages, and output the estimated time offset values. The estimated time offset values may be compared with actual time offset values to produce difference information, e.g., a residual signal. The IDS may analyze the residual signal based on a set of thresholds, generate an alert when the thresholds are met or exceeded, and take corrective actions in response to the alert. In some embodiments, for example, an IDS can use the physics-aware model to detect attacks introducing a time offset bias of approximately 150 nanoseconds (ns) per synchronization cycle.

In one embodiment, for example, an IDS may be implemented, at least in part, by a computing apparatus that includes processor circuitry. The computing apparatus also includes a memory communicatively coupled to the processor circuitry, the memory to store instructions that when executed by the processor circuitry, causes the processor circuitry to receive a message (e.g., a synchronization message, a follow up message, a packet delay message, etc.) with time information from a first device operating as a clock leader by a second device operating as a clock follower in a time-sensitive network or a time-synchronized network (TSN). The time information may include information to synchronize a first clock for the clock leader node and a second clock for the clock follower node to a network time for the TSN maintained by the first clock. The processor circuitry may retrieve an actual time offset value for the message. The actual time offset value may comprise a value between an actual sending time and an actual receiving time of the message. The processor circuitry may retrieve an estimated time offset value for the message. The estimated time offset value may comprise a value between an estimated sending time and an estimated receiving time of the message. The estimated time offset value may be generated using a TSN system model. The TSN system model may comprise or be implemented as a physics-aware model of a time synchronization process for the TSN. The processor circuitry may generate difference information (e.g., a residual signal) between the actual time offset value and the estimated time offset value for the message. The processor circuitry may determine whether the time information for the message has been modified or tampered with to cause the first clock and the second clock to desynchronize based on the difference information. Other embodiments are described and claimed.

In various embodiments the IDS may be designed to detect attacks external to a TSN node implementing the IDS or monitored by the IDS. Examples of attacks may include those attacks made external to the TSN node 104, such as a timing attack, a desynchronization attack, and other types of attacks to other TSN nodes in the TSN, such as relay nodes, switch nodes, clock leader nodes, and so forth. Some embodiments assume the TSN node implementing the IDS or monitored by the IDS is secure and not subject to a security attack. For example, the TSN node implementing the IDS or monitored by the IDS may implement a hardened execution environment. A hardened execution environment may be hardware-based or software-based with suitable hardware features and/or support. In various embodiments, the hardened execution environment may be implemented, for example, as a trusted platform module (TPM), a trusted computing base (TCB), a trusted execution environment (TEE), hypervisor-based environments, virtual machine environments, software guard extensions (SGX) made by Intel® Corporation, an Intel trusted execution technology (TXT), an Intel technology enabling platform (TEP), or other secure execution environment. A secure execution environment is a system of hardware, software, and firmware to execute secure and trusted processes and store confidential information. Embodiments are not limited in this context.

FIG. 1A depicts a time-synchronized network (TSN) 102 implemented according to a TSN standard (e.g., IEEE 1588, IEEE 802.1AS, IEEE 802.1Qbv, or the like). As depicted, TSN 102 includes various TSN nodes 104, such as TSN nodes 104*a*-*d*. The TSN nodes 104 may be implemented as different types of nodes for a TSN, such as an origination node, relay nodes, switch nodes or end node. The TSN nodes 104*a*-*d* are communicatively coupled via a TSN fabric 114. The TSN fabric 114 can connect the TSN nodes 104*a*-*d* using various types of network topology (e.g., mesh, star, etc.) and various types of communications channels (e.g., wired, wireless, fiber optic, buses, etc.). It is noted that the number of nodes in the TSN 102 is selected for purposes of clarity and not limitation. In practice, the TSN 102 can include any number and combination of nodes (e.g., origination nodes, switches, relay nodes, end devices, etc.).

The TSN nodes 104 can communicate with each other via the TSN fabric 114. For instance, the TSN nodes 104 can send messages 112 to each other over one or more communication channels provided by the TSN fabric 114. The messages 112 can include control information and payload information. One type of control information may include time information. The time information may comprise synchronization messages, time update messages or time follow-up messages (among other time protocol messages) for a time protocol used by the TSN 102.

Each TSN node 104 in the TSN 102 includes various hardware and/or software components. As depicted in FIG. 1A, a TSN 104 includes a clock manager 106, a clock 108 and an intrusion detection system (IDS) 110 (referred to herein as an "IDS" or "detector"). For instance, the TSN node 104*a* includes a clock manager 106*a*, a clock 108*a* and an IDS 110*a*. The TSN node 104*b* includes a clock manager 106*b*, a clock 108*b* and an IDS 110*b*. The TSN nodes 104*c*, 104*d* are similarly configured. It may be appreciated that these are just a few components for a TSN 104, and the TSN 104 can include other standard components for an electronic device, such as network interfaces, radio transceivers, input/output (I/O) components, memory units, processing circuits, controllers, sensors, actuators, mechanical parts, application software, operating system software, TSN-enabled platforms, and so forth.

In various embodiments, the clock manager 106 is implemented as a software component, and the clock 108 is implemented as a hardware component (e.g., "hardware clock" or "clock circuitry"). The IDS 110 can be implemented as a software component, a hardware component, or a combination of both software and hardware components. Embodiments are not limited in this context.

The clock manager 106 generally manages a time (e.g., clock signals) generated by the clock 108. A key component in clock synchronization mechanisms is the clock manager software. In a time-synchronized network such as the TSN 102, this component tightly interacts with network hardware (e.g., Ethernet/Wi-Fi) to obtain Precision Time Protocol (PTP) message timestamps, as well as with PTP clock hardware to implement suitable phase/frequency corrections in order to synchronize with a clock leader. The clock manager 106 typically implements a "clock servo." A clock servo is a control algorithm that periodically takes as input some measurement (or estimate) of clock offset to a reference clock, and computes as output either time (e.g., phase) or frequency adjustment to compensate for the given offset.

The clock 108 is generally a hardware clock that implements clock circuitry to generate signals for digital electronics implemented by the TSN node 104. In electronics and especially synchronous digital circuits, a clock signal oscillates between a high and a low state and is used to coordinate actions of the digital circuits. A clock signal is produced by a clock generator. Although more complex arrangements are used, the most common clock signal is in the form of a square wave with a 50% duty cycle, usually with a fixed, constant frequency. Circuits using the clock signal for synchronization may become active at either the rising edge, falling edge, or, in the case of double data rate, both in the rising and in the falling edges of the clock cycle. The clock 108 generates clock signals under control of the clock manager 106. The clock 108 can be implemented using any suitable hardware having a timing accuracy required by a given device or network. In the TSN 102, the clock 108 can be implemented as a PHC, although other hardware clocks can be implemented as well. Embodiments are not limited in this context.

In normal operation, a network interface (not shown) for a TSN node 104 can receive messages 112 that include time information representative of a network time for the TSN 102. The clock manager 106 can receive the time information from the network interface, analyze the time information, and determine whether time adjustments are needed for the clock 108. When time adjustments are needed, the clock manager 106 generates control information and sends the control information to the clock 108. The clock 108 receives the clock manager control information, and adjusts a parameter for the clock 108, such as a phase or frequency for the clock signals generated by the clock 108.

The IDS 110 generally monitors the clock manager 106 to detect abnormal or malicious behavior of the clock manager 106. In general, the IDS 110 is a device or software application that monitors a device, network or systems for malicious activity or policy violations. The IDS 110 may be specifically tuned to detect a timing attack, such as a desynchronization attack, or other TSN specific attack vector. Any intrusion activity or violation is typically reported either to other devices in the same network, an administrator, and/or collected centrally using a security information and event management (SIEM) system. A SIEM system combines outputs from multiple sources and uses alarm filtering techniques to distinguish malicious activity from false alarms. In addition to the TSN node 104, the IDS 110 may be implemented for other devices in the TSN, such as relay nodes 104a-104c, to provide a more comprehensive security solution to an attacker.

The IDS 110 can operate in an on-line or off-line mode. When operating in an on-line mode, the IDS 110 examines network traffic in real time. It performs an analysis of passing traffic on the entire subnet, and matches the traffic that is passed on the subnets to the library of known attacks. For instance, it analyses the message 310 (e.g., a TSN timing message) and applies some rules, to decide if it is an attack or not. Off-line mode typically deals with stored data and passes it through some processes to decide if it is an attack or not. For the offline case, a message may be replicated for offline analysis. It may be replicated in hardware without incurring a memory copy. However, a software solution may copy the message from the queue for later analysis. In either mode, once an attack is identified, or abnormal behavior is sensed, an alert can be sent to a SIEM, a network administrator, or a software application to automatically implement security protocols, such as dropping the message 112, isolating an infected device guarded by the IDS 110, and/or re-configuring one or more network paths for impacted devices in the TSN network.

The IDS 110 can utilize any number of different detection methods to detect an attack. For instance, the IDS 110 may implement a signature-based method, a statistical anomaly-based method, a stateful protocol analysis method, machine-learning based, or some combination of all four methods. A signature-based IDS monitors packets in the network and compares with pre-configured and pre-determined attack patterns known as signatures. A statistical anomaly-based or machine-learning based IDS monitors network traffic and compares it against an established baseline. The baseline will identify what is "normal" for that network, such as what sort of bandwidth is generally used and what protocols are used. A stateful protocol analysis IDS identifies deviations of protocol states by comparing observed events with defined profiles of generally accepted definitions of benign activity. It will be appreciated that these detection methods are by way of example and not limitation. Other embodiments may use different detection methods as well. The embodiments are not limited in this respect.

Figure 1B:
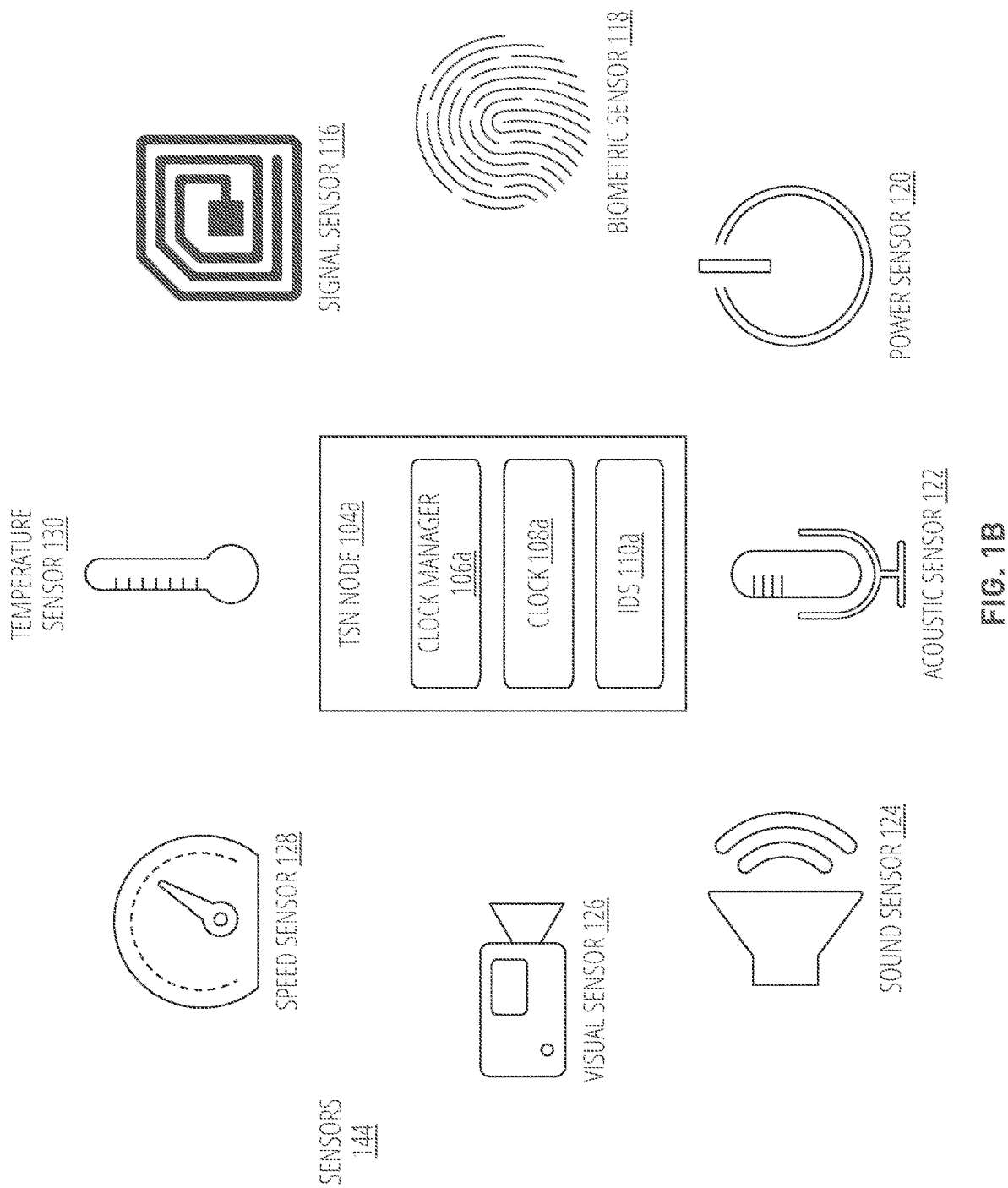
FIG. 1B illustrates an aspect of a TSN 102 for sensors in accordance with one embodiment.

FIG. 1B illustrates an example of a TSN node 104a of the TSN 102 designed to control one or more sensors 144. As depicted in FIG. 1B, the TSN node 104 manages various types of sensors 144, such as a signal sensor 116, a biometric sensor 118, a power sensor 120, an acoustic sensor 122, a sound sensor 124, a visual sensor 126, a speed sensor 128, a temperature sensor 130, and so forth. The TSN node 104a may be suitable for implementing a physics-based model for the IDS 110. A physics-based approach as proposed herein utilizes state prediction based on physical models of system dynamics. Unlike conventional information-based security measures, the physics-based model may utilize physical properties of a system, along with controller state estimation, to enable computationally-inexpensive analytical redundancy. For example, a mathematical model-based replica of the system is simultaneously executed to detect attacks.

Figure 1C:
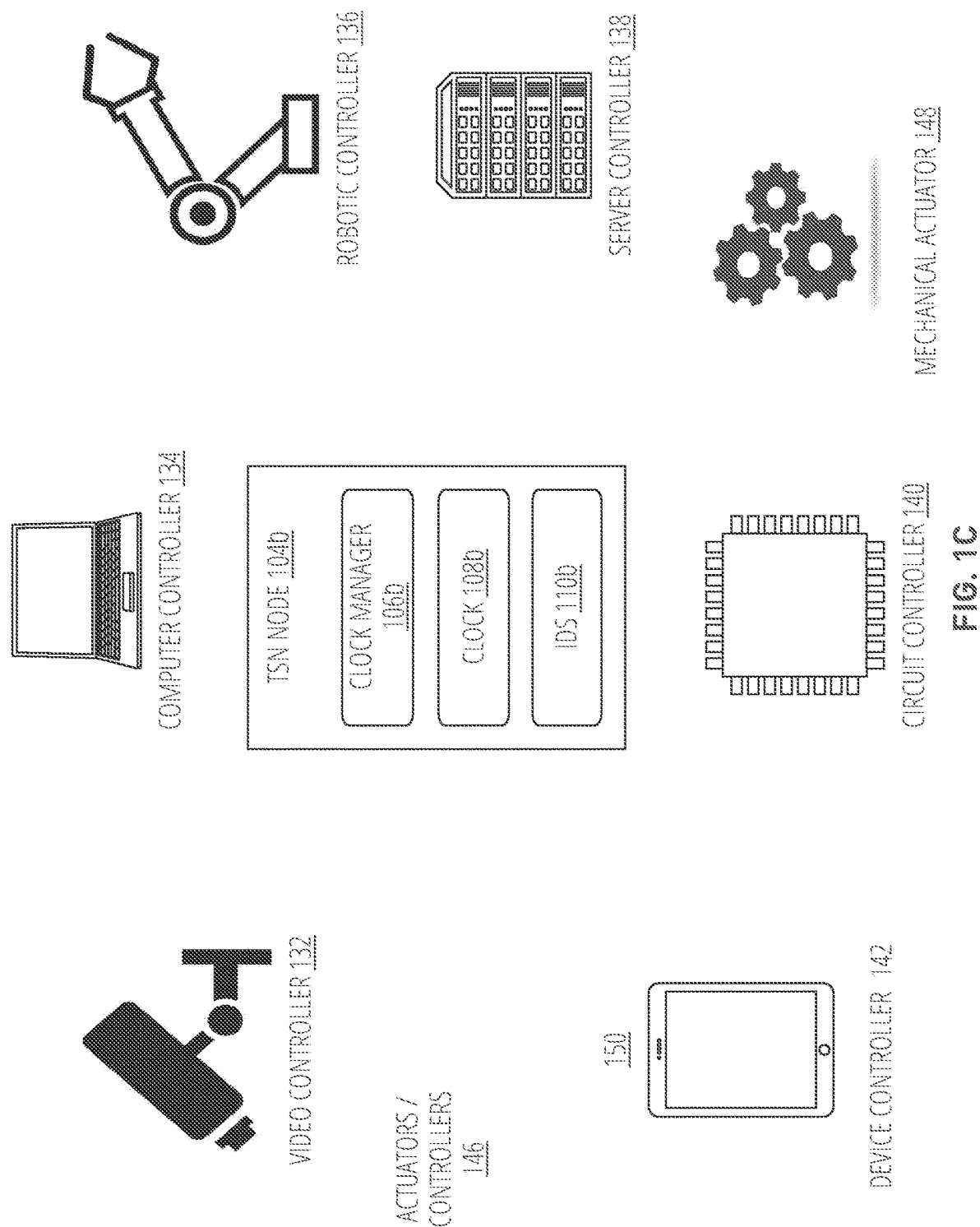
FIG. 1C illustrates an aspect of a TSN 102 for actuators in accordance with one embodiment.

FIG. 1C illustrates an example of a TSN node 104b of the TSN 102 designed to control one or more actuators and/or host controllers 146. As depicted in FIG. 1C, the TSN node 104b manages various types of actuators/controllers 146, such as a robotic controller 136, a server controller 138, a mechanical actuator 148, a circuit controller 140, a device controller 142, a video controller 132, a computer controller 134, and so forth. As with FIG. 1B, the TSN node 104b shown in FIG. 1C may be suitable for implementing a physics-based model for the IDS 110, as discussed in more detail herein.

In time-synchronized networks, such as the TSN 102 depicted in FIGS. 1A-1C, it becomes important for all the TSN nodes 104 to synchronize to a common or shared network time for the TSN 102. For instance, the TSN nodes 104 may operate in accordance with IEEE 802.1AS which implements a hierarchical network to synchronize one or more clock follower (CF) nodes to a clock leader (CL) node (e.g., a grand CL) through relay nodes or switch nodes. Synchronization is performed through communication of time messages, such as the messages 112. The time messages may comprise, for example, time synchronization messages, time update messages and/or time follow-up messages for a PTP.

In some cases, an attacker may simply attempt to disrupt timing of a single TSN node 104 handling critical functions, such as disrupting one or both of the TSN node 104a managing the sensors 144 and/or the TSN node 104b managing the actuators/controllers 146. Rather than attempting to disrupt timing for the entire TSN 102, the attacker may attempt to attack timing of a single TSN node 104 to disrupt key operations for the TSN node 104, such as an electronic control unit (ECU) to control speed sensing for a vehicle or a controller for a robotic arm in a factory.

In other cases, an attacker may attempt to disrupt timing across the entire TSN 102. To attack or disrupt the TSN 102, an attacker may attempt a timing attack or desynchronization attack to compromise timing for one or more of the TSN nodes 104 in the TSN 102. Assume the TSN node 104c operates as a clock leader (CL) in the TSN 102, and the TSN node 104d operates as a clock follower (CF) in the TSN 102. If an attacker located on a network device (e.g., switch or relay) modifies a critical attribute on a specific port, then all downstream nodes from that network device will suffer a desynchronization event. In this example, if the attacker successfully compromises the TSN node 104c, then the TSN node 104d is vulnerable to a timing attack in the form of receiving messages 112 from the TSN node 104c with erroneous time information. Therefore, it becomes important to detect and localize an attack as quickly as possible. Furthermore, upon detection, it becomes important for the TSN 102 to quickly isolate the compromised network device and thereby prevent the desynchronization attack from spreading to other downstream nodes.

In all cases, a time-synchronized network such as the TSN 102 is vulnerable to a timing attack or a desynchronization attack. If a single network node is compromised, it may cause a cascade failure across the entire TSN 102. An example of such an attack is further described with reference to FIGS. 2A, 2B, 3A and 3B.

Figure 2A:
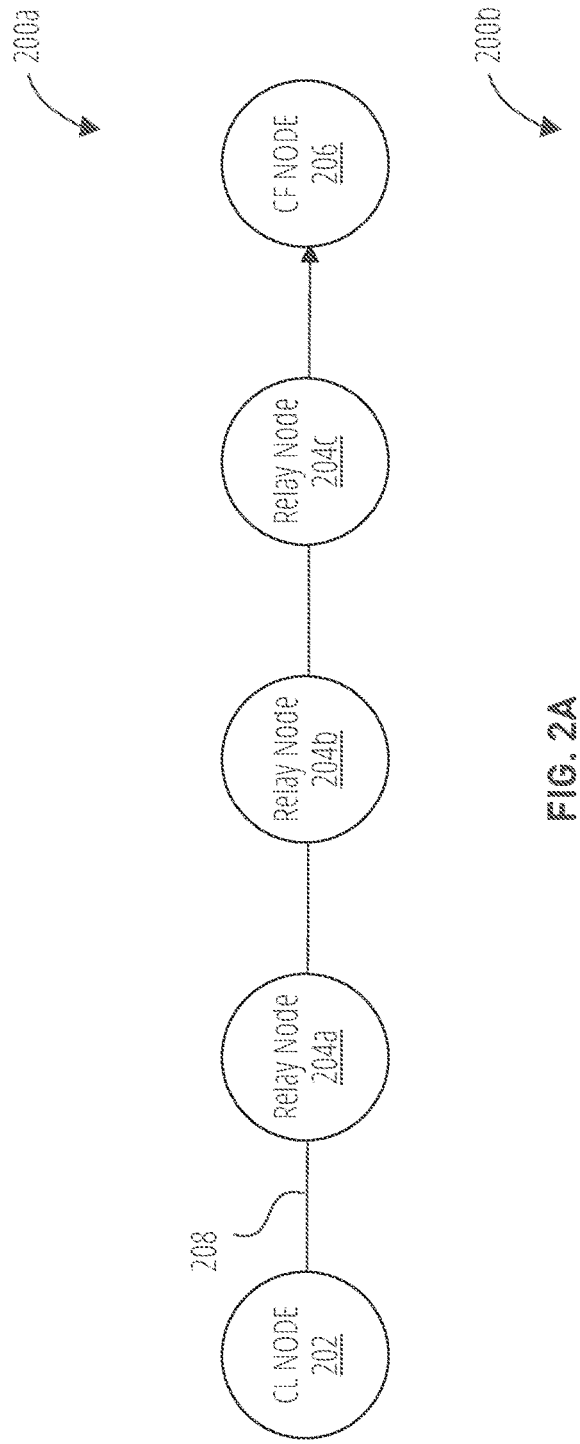
FIG. 2A illustrates an aspect of a TSN 200a in accordance with one embodiment.

FIG. 2A depicts a TSN 200a implemented according to a TSN standard (e.g., IEEE 1588, IEEE 802.1AS, IEEE 802.1Qbv, or the like). As depicted, the TSN 200a includes clock leader node 202, relay nodes 204a, 204b, and 204c, and clock follower node 206, all communicatively coupled via communication channel 208. The clock leader node 202 and the clock follower node 206 have a "master/slave" relationship, where the clock leader node 202 is treated as a "master" device and the clock follower node 206 is treated as a "slave" device. The clock leader node 202 includes a clock that maintains a network time for the TSN 102. The clock follower node 206 includes a clock that synchronizes a clock to the network time via one or more of the messages 112. Alternatively, the clock leader node 202 and the clock follower node 206 may be implemented as a "talker node" and a "listener node", respectively. This configuration refers to data transmission, where the talker node transmits data and the listener node listens or receives data. This configuration is used, for example, in scheduled traffic.

Relay nodes 204a, 204b, and 204c are time-aware switching nodes and can be any number of devices in a network arranged to communicate information. A clock leader node 202 sends or originates information and a clock follower node 206 receives or consumes information. Examples of a clock leader node 202 or a clock follower node 206 include devices such as electronic control units in an autonomous vehicle, an industrial system, a medical system, or the like. Additionally, communication channel 208 can be any of a variety of communication channels, including wired or wireless communication channels. In some implementations, all devices in the TSN 200a will receive GCL tables. However, in some implementations, only clock leader nodes 202 and switching nodes (e.g., relay node 204a, etc.) receive GCL tables while destination devices (e.g., clock follower node 206) do not receive a GCL table.

Figure 2B:
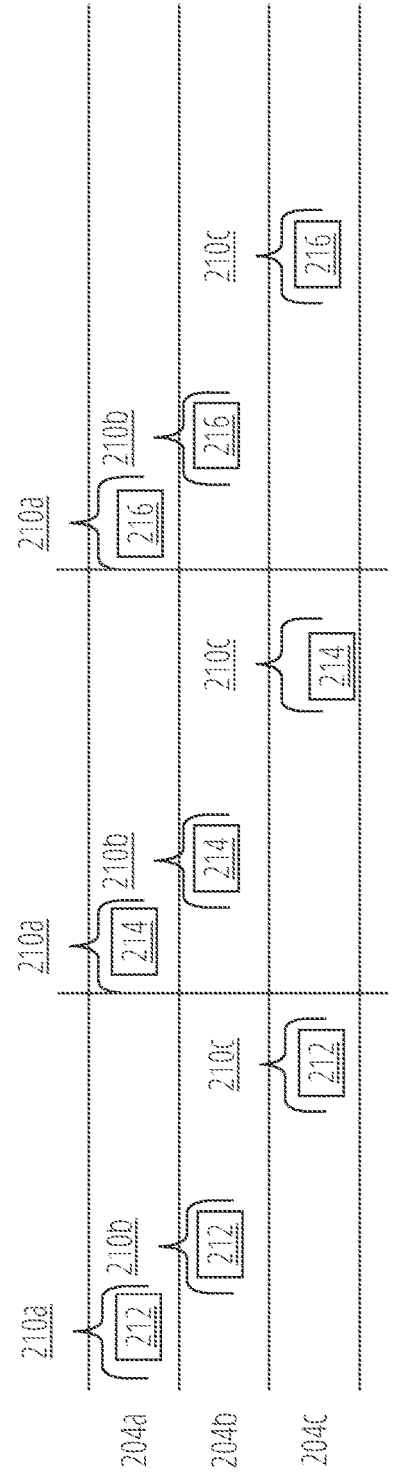
FIG. 2B illustrates an aspect of a timing diagram 200b in accordance with one embodiment.

FIG. 2B depicts a timing diagram 200b depicting communication windows (e.g., Qbv windows, or the like) for switches of TSN 200a based on GCL tables. Typically, GCL tables are generated in a network controller (not shown) and are designed to prioritize time critical (TC) traffic and prevent lower priority traffic from accessing communication channel 208, thus guaranteeing the timely delivery of TC packets within pre-configured time windows. In particular, timing diagram 200b depicts Qbv windows 210a, 210b, and 210c in which packets 212, 214, and 216 are transmitted. It is noted that the communication windows referred to herein are referred to as Qbv windows or protected windows for clarity. However, other standard or techniques for forming protected communication windows to facilitate time synchronization can be used besides Qbv windows. Examples are not limited in this context.

To facilitate transmission of packets (e.g., packet 212, etc.) during protected windows (e.g., Qbv window 210a, etc.), nodes in the TSN 200a are time synchronized and scheduled to transmit TC packets (e.g., packet 212, etc.) using non overlapping protected windows (e.g., Qbv window 210a, etc.). It is to be appreciated that providing latency bounded communication (e.g., as depicted in timing diagram 200b) requires tight synchronization of time between nodes in TSN 200a. With such dependency on time synchronization, reliable TSN operation can be disrupted by attacking the timing of the network, sometimes referred to as a desynchronization attack or event.

Figure 3A:
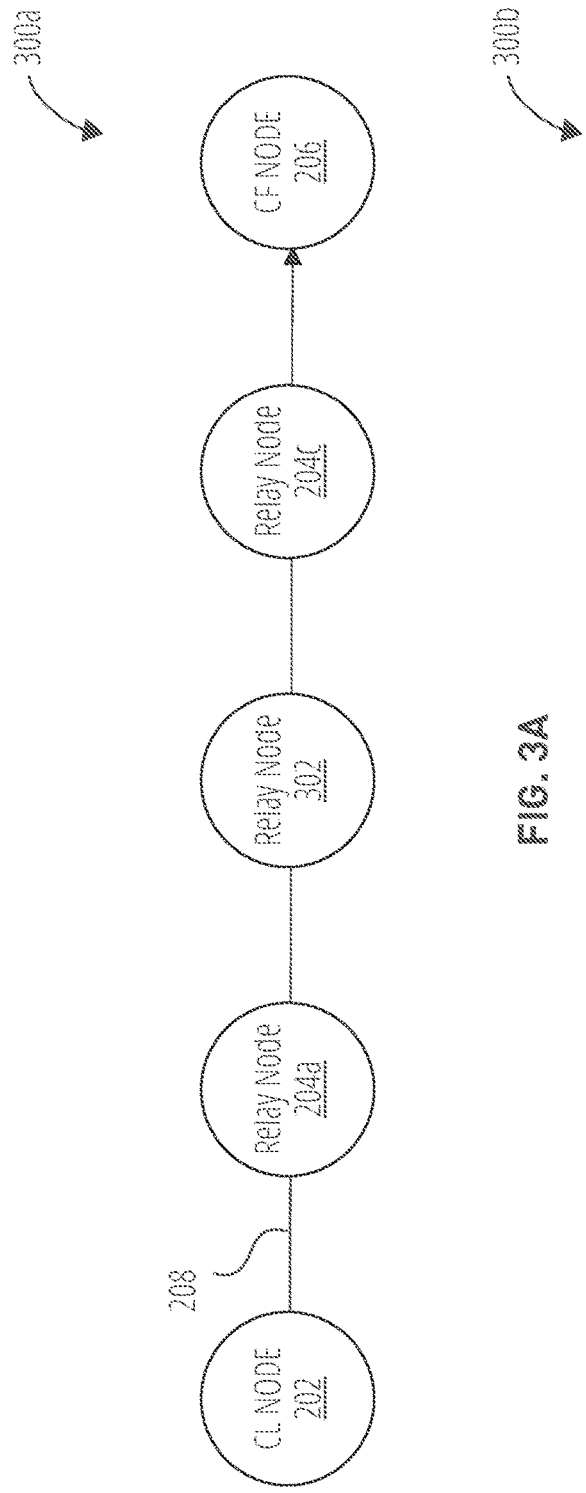
FIG. 3A illustrates an aspect of a TSN 300a in accordance with one embodiment.

FIG. 3A depicts a TSN 300a, which is like TSN 200a except that the relay node 302 is depicted as compromised. In particular, the clock (not shown) of relay node 302 can be attacked and compromised, thereby causing the Qbv window 210b associated with relay node 302 to be misaligned with respect to, and even overlap with, the protected windows of the other switch nodes in the data stream path (e.g., along communication channel 208).

Figure 3B:
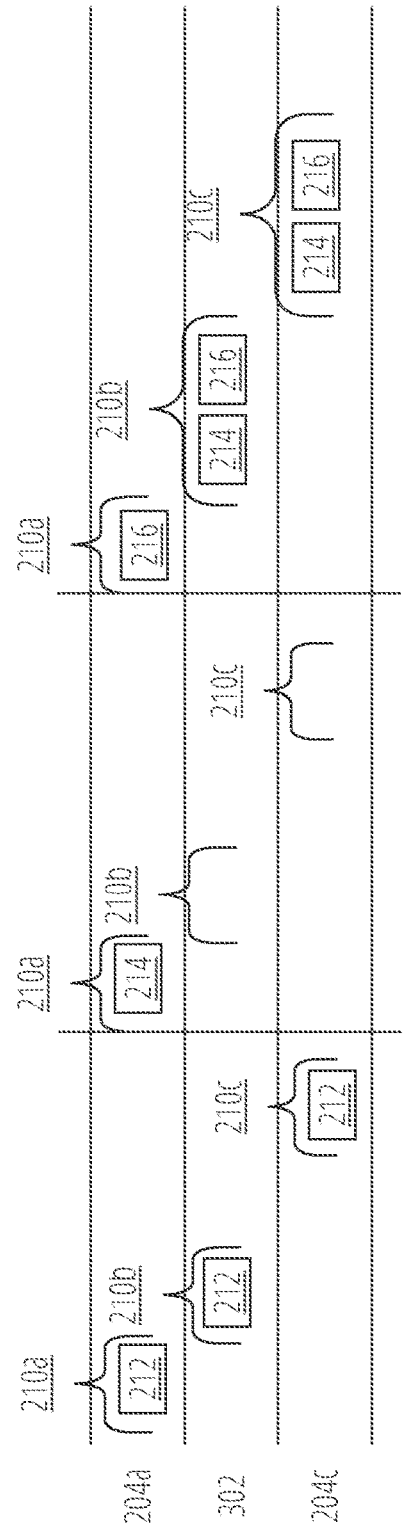
FIG. 3B illustrates an aspect of a timing diagram 300b in accordance with one embodiment.
Figure 4:
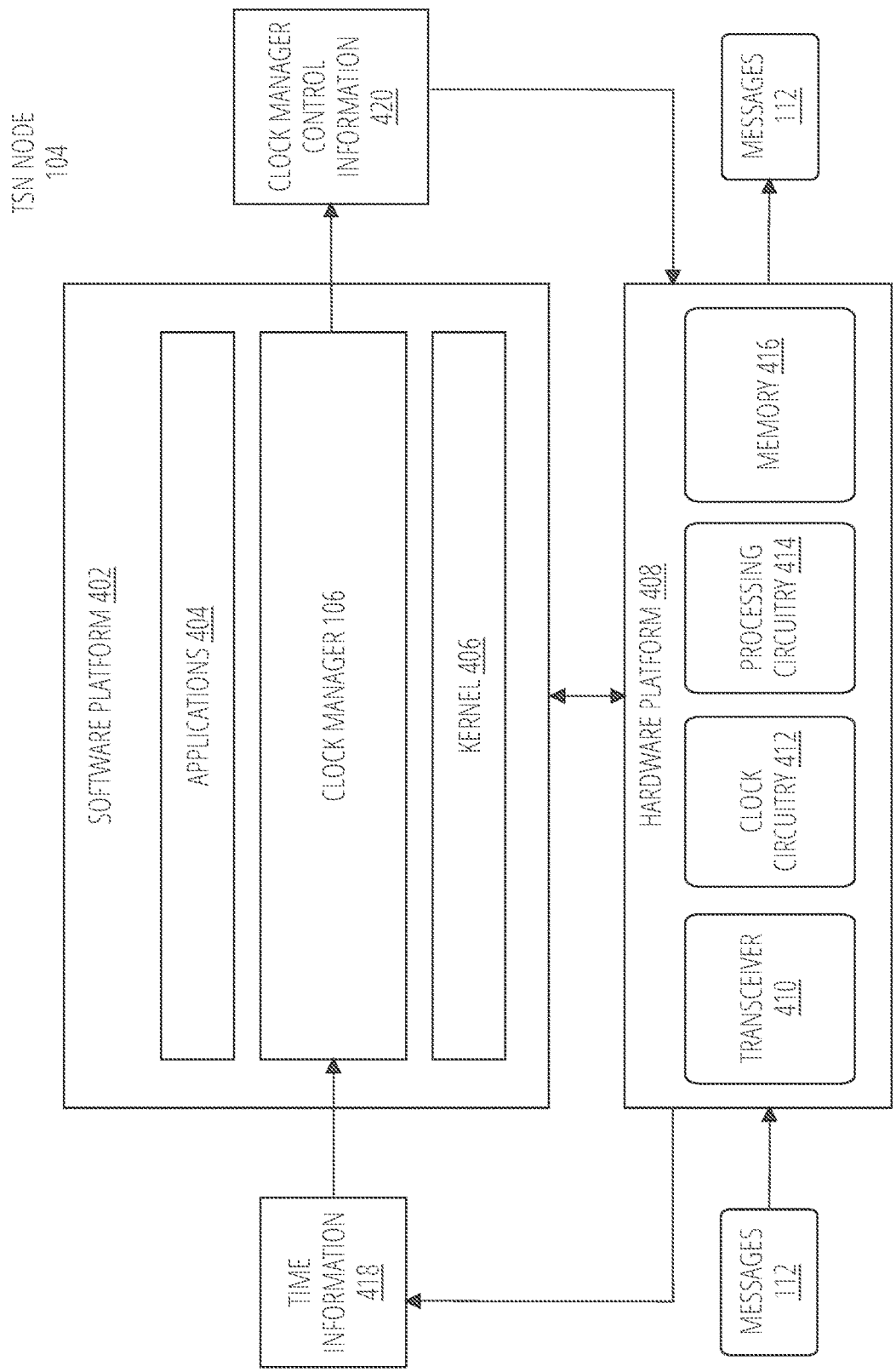
FIG. 4 illustrates an aspect of a TSN node 104 in accordance with one embodiment.

FIG. 3B depicts timing diagram 300b illustrating Qbv window 210b misaligned with Qbv window 210a and Qbv window 210c and overlapping with Qbv window 210a. As such, packets (e.g., packet 214 in the figure) arrive too late with respect to the attacked switch protected window (e.g., Qbv window 210b) causing them to be buffered and sent in the next protected window. As a result of the delay in transmitting packet 214, relay node 302 breaks the latency bound of the stream that it is serving and can result in errors or comprise the safety of the system in which the nodes are operating FIG. 4 illustrates a more detailed view of a TSN node 104 that implements one or more TSN protocols or standards. The TSN node 104 may be implemented as any network devices suitable for operation within a TSN, such as TSN 102, 200a, 300a, and so forth. The TSN node 104 may be implemented as part of a vehicle, robot, industrial machine or any other devices suitable for a TSN. The TSN node 104 may be implemented as an origination node 202, relay nodes 204a-204c, relay node 302 and/or end node 206. The TSN node 104 may be implemented as either a clock leader (CL) or a clock follower (CF) in a TSN. The TSN node 104 may include interfaces to communicate information with other TSN nodes 104 in the TSN 102, such as messages 112, for example.

The TSN node 104 may operate in accordance with a timing protocol, such as a precision time protocol (PTP) for IEEE 1588, IEEE 802.1AS, and so forth. For instance, the TSN node 104 may operate in accordance with IEEE 802.1AS which implements a hierarchical network to synchronize clock followers (CFs) to a clock leader (CL) through relays or switch nodes. Synchronization is performed through communication of time messages, such as the messages 112. The time messages may comprise, for example, time synchronization messages, time update messages or time follow-up messages (among others) for a PTP. The time messages may include, among other fields and attributes, a correction field, which accumulates a network residence, and an origin timestamp for a CL. The time message may also comprise, for example, a packet delay message type with additional fields and attributes.

As depicted in FIG. 4, the TSN device 104 may include a software platform 402 and a hardware platform 408. The software platform 402 may include, among other software components, one or more applications 404, a clock manager 106, and a kernel 406. The hardware platform 408 may include, among other hardware components, a network interface such as a transceiver 410, clock circuitry 412, processing circuitry 414 and memory 416.

The processing circuitry 414 may include circuitry or processor logic, such as, for example, any of a variety of commercial processors. In some examples, the processing circuitry 414 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processing circuitry 414 may include graphics processing portions and may include dedicated memory, multiple-threaded processing and/or some other parallel processing capability. In some examples, the processing circuitry 414 may be an application specific integrated circuit (ASIC) or a field programmable integrated circuit (FPGA). In some examples, the processing circuitry 414 may be circuitry arranged to perform computations related to TSN, such as switching, clock leader, clock follower, routing, security, and so forth.

The memory 416 may include logic, a portion of which includes arrays of integrated circuits, forming non-volatile memory to persistently store data or a combination of non-volatile memory and volatile memory. It is to be appreciated, that the memory 416 may be based on any of a variety of technologies. In particular, the arrays of integrated circuits included in memory 406 may be arranged to form one or more types of memory, such as, for example, dynamic random access memory (DRAM), NAND memory, NOR memory, or the like.

The transceiver 410 may include logic and/or features to support a communication interface. For example, the transceiver 410 may include one or more interfaces that operate according to various communication protocols or standards to communicate over direct or network communication links. Direct communications may occur via use of communication protocols or standards described in one or more industry standards (including progenies and variants). For example, the transceiver 410 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In some examples, transceiver 410 may be arranged to support wireless communication protocols or standards, such as, for example, Wi-Fi, Bluetooth, ZigBee, LTE, 5G, or the like.

The TSN node 104 may also include where the network is a controller area network (CAN) or a vehicle area network (VAN). The TSN node 104 may be implemented as a device that manages a sensor, actuator or a controller. The sensors may comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, an acoustic sensor, and so forth.

In one aspect, the TSN node 104 may be implemented as a CL or CF for the TSN 102. As previously discussed, the clock manager 106 may ensure that the clock circuitry 412 maintains a network time for the TSN 102. When operating in a CL role, the clock manager 106 may send a message 112 with time information 418 representing a current network time to one or more nodes operating in a CF role for the TSN 102. When operating in a CF role, the clock manager 106 may receive a message 112 from a CL node. The clock manager 106 may use the time information 418 from the message 112 to synchronize a local device time with the current network time maintained by the clock circuitry 412. The clock manager 106 analyzes the time information 418, and determines whether to adjust a parameter (e.g., phase or frequency) of the clock circuitry 412 to synchronize the clock circuitry 412 to the current network time.

Figure 5:
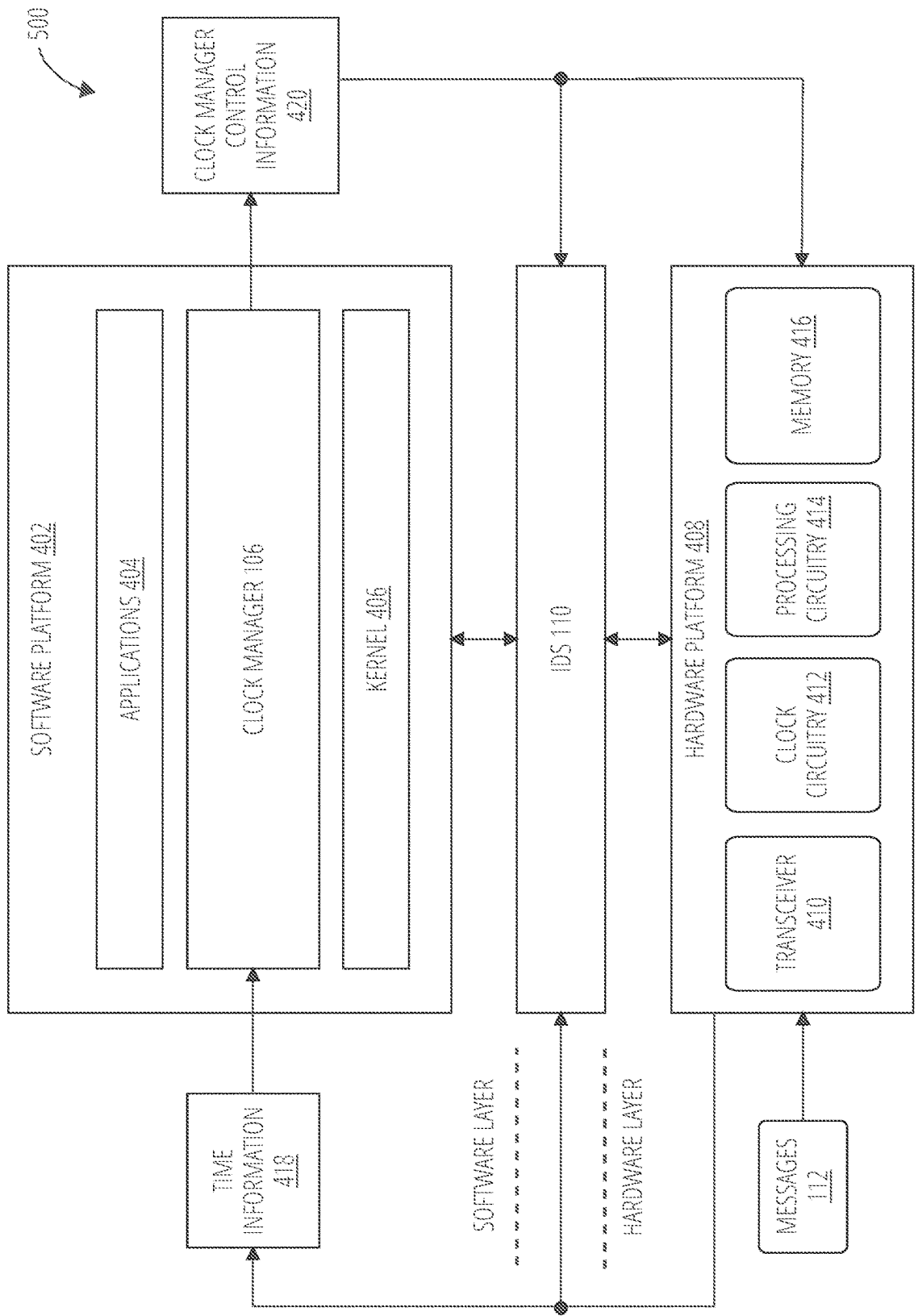
FIG. 5 illustrates an aspect of an apparatus 500 in accordance with one embodiment.

FIG. 5 illustrates an apparatus 500. Similar to the apparatus 400, the apparatus 500 includes a software platform 402 and a hardware platform 408.

In addition, the apparatus 500 includes an IDS 110 to monitor the TSN node 104. As previously discussed, the IDS 110 generally monitors the TSN node 104 to detect abnormal or malicious behavior internal or external to the TSN node 104. For instance, the IDS 110 monitors the outputs of the clock manager 106, such as the clock manager control information 420 sent from the clock manager 106 to the clock circuitry 412 as output. The IDS 110 uses the clock manager control information 420 to generate an estimate or prediction for the time information 418. The IDS 110 suspects or detects abnormal or malicious behavior based on deviations between the clock manager control information 420 and the estimates or predictions for the time information 418 received by the TSN node 104.

As depicted in FIG. 5, the apparatus 500 includes a clock circuitry 412 to implement a hardware clock (e.g., a PHC) for a device, such as a TSN node 104. The apparatus 500 includes a processing circuitry 414 coupled to the clock circuitry 412, the processing circuitry 414 to execute instructions to perform operations for a clock manager 106. The clock manager 106 is operative to receive messages 112 with time information 418 for a network, such as TSN 102. The clock manager 106 generates clock manager control information 420 to adjust the clock circuitry 412 to a network time for the TSN 102. The clock manager control information 420 may comprise one or more parameters to adjust the clock circuitry 412 for the apparatus 500. The one or more parameters may represent, for example, adjustments to a phase or frequency of the clock circuitry 412. For example, the clock manager control information 420 may comprise a phase or frequency adjustment based on a time offset between a reference time and a time maintained by the clock circuitry 412. The reference time is based on the time information 418 in at least one message 112.

The apparatus 500 further includes an IDS 110 coupled to the processing circuitry 414 and the clock circuitry 412. In one embodiment, the IDS 110 may be implemented as part of a software layer for the apparatus 500, such as the software platform 402. In another embodiment, the IDS 110 may be implemented as part of a hardware layer for the apparatus 500, such as the hardware platform 408. In yet another embodiment, certain elements of the IDS 110 may be implemented in the software platform 402, while other elements of the IDS 110 may be implemented in the hardware platform 408. Embodiments are not limited in this context.

Although FIG. 5 depicts the IDS 110 implemented as part of the apparatus 500, it may be appreciated that the IDS 110 may be implemented by another apparatus, device or system communicatively coupled to the apparatus 500. For instance, the IDS 110 may be implemented as part of an IDS for the apparatus 500 that is separate from the apparatus 500 or a device other than a device that implements the apparatus 500. For instance, if the apparatus 500 is implemented by a TSN node 104a, the IDS 110 of the apparatus 500 could optionally be implemented in a TSN node 104b. The IDS 110 could also be implemented by an IDS communicatively coupled to the TSN node 104, either directly via a wired or wireless connection, or indirectly via the TSN fabric 114. Embodiments are not limited in this context.

The IDS 110 is operative to consume multiple types of information to detect a security attack. For instance, the IDS 110 can receive and analyze messages 112 for a TSN node implementing the software platform 402 and/or the hardware platform 408. The messages 112 may carry time information for a TSN node, such as an origin time, resident time, link delays, among other types of clock information. The messages 112 may comprise, for example, synchronization messages or follow-up messages. The TSN node retrieves or decodes the time information from the messages 112, and utilize the time information to synchronize an internal local clock with a network time issued by a clock leader or grand clock leader. The IDS 110 can also receive and analyze other types of information, such as clock manager control information 420 in transit from the clock manager 106 of the software platform 402 to the hardware platform 408. For instance, the IDS 110 can consume software control messages, or it can have one or more taps on a hardware bus or signal lines used to communicate electrical signals to the hardware platform 408. The IDS 110 analyzes the messages 112 and/or other types of information and determines whether to generate an alert or take corrective action for the apparatus 500 based on results of the analysis.

The messages 112 are communicated between TSN nodes at a certain frequency or rate which can be measured in a number of messages sent or received per unit of time, such as a number of messages sent per second. This is referred to herein as a "message frequency." The message frequency for transmission of the messages 112, which carry origin time (Sync/FollowUp) and link delay computation (LDC), is typically dependent on the latency requirements of a time-sensitive application. The message frequency is usually calculated during a design phase for a TSN, considering a variety of factors, and instantiated during initialization of a TSN or individual TSN nodes.

Cybersecurity is increasingly becoming a critical or core function within a TSN. Numerous security devices, such as the IDS 110, are deployed throughout a TSN. Each deployed IDS 110 monitors a TSN node or group of TSN nodes, receiving the messages 112 and analyzing the messages 112 for anomalies or abnormalities indicative of a security attack. Despite increasing security of a TSN, the multitude of IDS 110 can still have difficulty detecting attacks that introduce slight time offset bias into the messages 112. For instance, an attack may attempt to modify each message 112 with a time offset bias on the order of nanoseconds or microseconds per synchronization cycle. Clock drift in a TSN node, such as a clock follower node 206, may accumulate over time until it reaches a point where the TSN node or a TSN application consuming time from a clock of the TSN node destabilizes or fails. Meanwhile, the IDS 110 may not be sensitive enough to notice to lower levels of time offset bias in sufficient time to detect the attack and take corrective actions. As a consequence, performance of an IDS 110 may be limited by the current parameters. In other words, detection of an ongoing security attack is delayed or completely evaded due to inability to detect time offset bias with a sufficient amount of sensitivity.

To solve these and other challenges, embodiments implement a physics-aware model to detect time offset bias in messages 112 on the order of hundreds-of-nanoseconds or microseconds per synchronization cycle. The physics-aware model is based on analytical or mathematical principles that model a time-synchronization process as a closed-loop control system. In a closed-looped control system, time offset measurements invoke clock adjustment, such as frequency adjustment, computation and actuation. This in turn affects a next measured time offset value. Mathematically characterizing a controlled variable as a function of excitation input produces a model of a controlled process. Embodiments mathematically characterize a time offset as a function of clock adjustment (such as frequency adjustment) to produce a model of a closed-loop control system, where the closed-loop control system is a time-synchronization process within a TSN 102.

Figure 6:
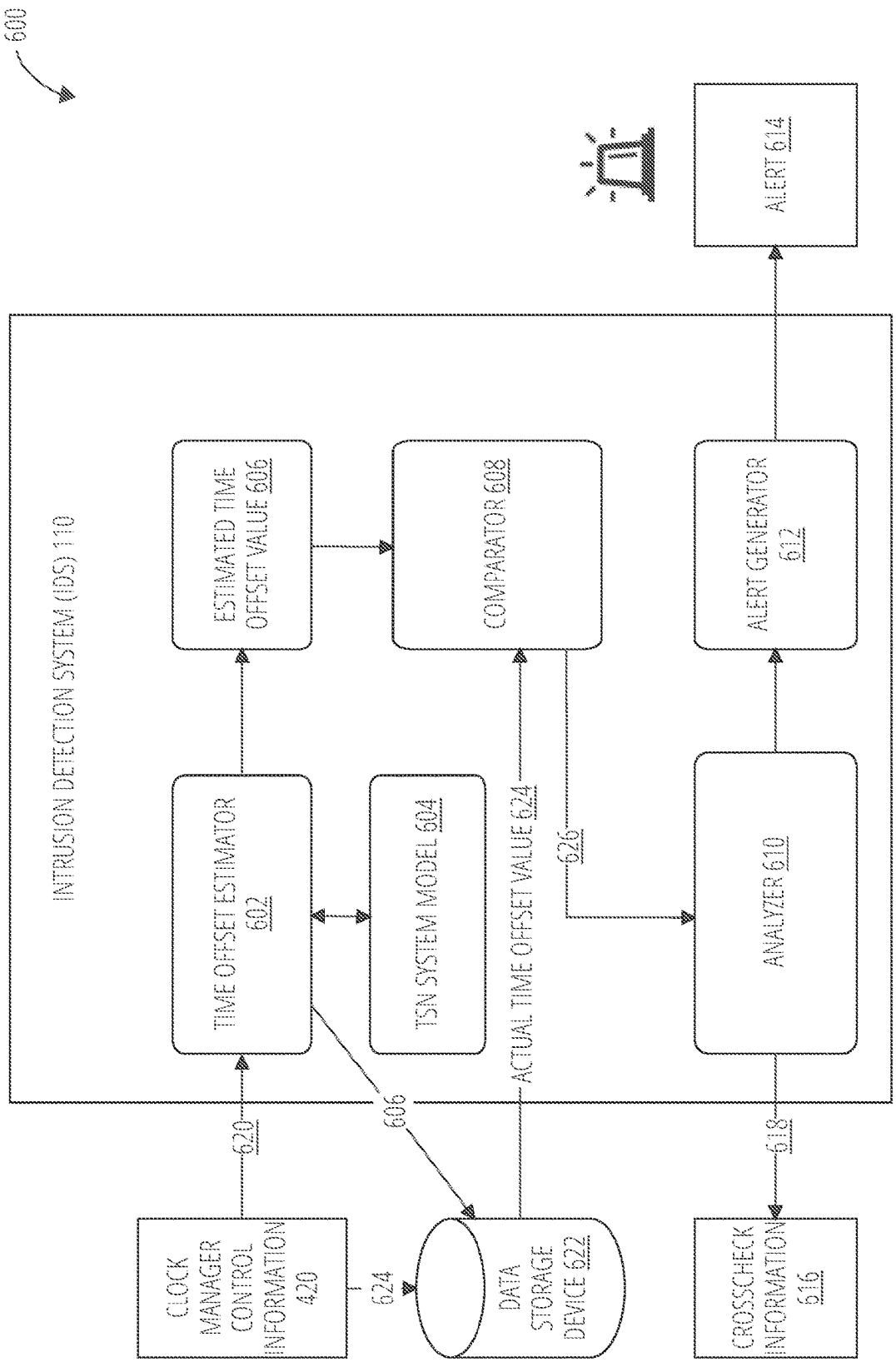
FIG. 6 illustrates an aspect of an IDS 110 in accordance with one embodiment.

FIG. 6 illustrates a system 600 with a more detailed view of an IDS 110. As depicted in FIG. 6, an IDS 110 may include a time offset estimator 602, a TSN system model 604, one or more estimated time offset values 606, a comparator 608, an analyzer 610, and an alert generator 612. In general, the IDS 110 can receive as input clock manager control information 420 from a clock manager 106 generated based on one or more messages 112 received by a TSN node 104. The IDS 110 may analyze the actual time offset value 624 for potential security threats (e.g., a desynchronization attack), and output an alert 614 and/or crosscheck information 616. The IDS may output the alert 614 when a security attack is suspected or confirmed. The IDS may output the crosscheck information 616 to confirm information carried by one or more messages 112 communicated within a TSN 102, 200 or 300, such as messages 112 sent from a device operating in a clock leader role and received by a device operating in a clock follower role.

In one embodiment, for example, the IDS 110 may be implemented, at least in part, by a computing apparatus that includes processor circuitry. The computing apparatus also includes a memory communicatively coupled to the processor circuitry, the memory to store instructions that when executed by the processor circuitry, causes the processor circuitry to receive a message 112 with time information 418 from a first device operating as a clock leader (e.g., clock leader node 202 or TSN node 104a) by a second device operating as a clock follower (e.g., clock follower node 206 or TSN node 104b) in a time-synchronized network (TSN) 102. The time information 418 may include information to synchronize a first clock 108a for the TSN node 104a and a second clock 108b for the TSN node 104b to a network time for the TSN 102 maintained by the first clock 108a. The processor circuitry may retrieve an actual time offset value 624 for the message 112. The actual time offset value 624 may comprise a value between an actual sending time and an actual receiving time of the message 112. The processor circuitry may retrieve an estimated time offset value 606 for the message 112. The estimated time offset value 606 may comprise a value between an estimated sending time and an estimated receiving time of the message 112. The estimated time offset value 606 may be generated using a TSN system model 604. The TSN system model 604 may be implemented as a physics-aware model of the TSN 102. The processor circuitry may generate difference information 626 between the actual time offset value 624 and the estimated time offset value 606 for the message 112. The processor circuitry may determine whether the time information 418 for the message 112 has been modified to cause the first clock 108a and the second clock 108b to desynchronize based on the difference information 626.

In various embodiments, the computing apparatus may also include where the device operates in accordance with an IEEE 802.1AS, IEEE 802.1Qbv, or IEEE 1588 standards. The computing apparatus may also include where the network time is a precision time protocol (PTP) time. The computing apparatus may also include where the messages are synchronization messages or follow up messages for a precision time protocol (PTP). The computing apparatus may also include where the clock managed by the clock circuitry is a precision time protocol (PTP) hardware clock (PHC). The computing apparatus may also include where the device operates in a clock follower role of the time-synchronized network. The computing apparatus may also include where the messages with time information are received from a device operate in a clock leader role of the time-synchronized network.

By way of example, assume the TSN 102 operates as an IEEE 1588 system utilizing the precision time protocol (PTP). An IEEE 1588 system is a distributed network of PTP enabled devices and possibly non-PTP devices. Further assume the TSN node 104a operates as a clock leader node 202 and the TSN node 104b operates as a clock follower node 206. The TSN node 104a sends messages 112 with time information 418 to synchronize or syntonize the clock 108b of the TSN node 104b with the clock 108a of the TSN node 104a in accordance with normal PTP operations.

Time synchronization implies phase-locking two clocks and making them agree on the same time of day. Phase locking means that incrementing the time does not only happen at the same rate in both clocks but also at the same time. Agreeing on the time of day means synchronizing a "wristwatch time", that is year, month, day, hour, minute, seconds and so on in a given timezone. Any ordinary clock or boundary clock with a port in the slave state synchronizes to its respective master in the hierarchy.

Time syntonization means frequency locking two clocks by agreeing on the length of a second. Syntonized clocks, therefore, are running at the same rate. Any port in the slave state and any transparent clock syntonizes to the clock leader or grandmaster (GM) in the TSN 102.

In general, the operation of PTP can be conceptually divided into a two-stage process. In the first stage, the PTP devices self-organize logically into a synchronization hierarchy tree using the Best Master Clock Algorithm (BMCA). The TSN nodes 104 are continuously exchanging quality properties of their internal clock with each other. The PTP device with the highest quality clock in the system eventually assumes the role of clock leader or grandmaster (GM) and provides a reference time for the entire system of the TSN 102. The subnet scope in which all clocks synchronize to the GM is called a PTP domain. In the second stage, time information 418 continuously flows downstream from the GM between pairs of PTP ports with one port in the master state serving time information 418 and the other in the slave state receiving time information 418. Eventually, the system reaches an equilibrium where all clocks are synchronized to the GM of the system. Time synchronization between master and slave is initiated by the master port, which periodically sends synchronization messages to its slave. These messages are timestamped by the master at transmission and by the slave at arrival. A slave now has two timestamps, the sending time according to the clock of the master, and the receiving time according to its clock. As the message takes some time to travel through the network, the slave also needs to know the network delay to calculate the offset to the master.

PTP supports two mechanisms to calculate this delay: End-to-End (E2E) and Peer-to-Peer (P2P). The E2E mechanism requires the slave to measure the total delay between itself and the master. The P2P mechanism, on the other hand, requires each device on the path between master and slave to measure the delay between itself and its direct neighbor (peer). This includes any switches and routers, such as relay nodes 204 or relay node 302. The total network delay between master and slave is the sum of the peer delays along the path. Technically, E2E can be used in the same domain as P2P as long as the two are not mixed along the same messaging path. Thus, between master and slave, all nodes must either use E2E or P2P.

In operation, the hardware platform 408 of the TSN node 104*b* periodically receives the message 112 with time information 418 from the TSN node 104*a* operating as a clock leader node 202 in the TSN 102. The time information is processed by the clock manager 106*b*, which outputs clock manager control information 420. The hardware platform 408 of the TSN node 104*b* receives the clock manager control information 420, and adjusts operations for the clock circuitry 412 of the clock 108*b*.

The IDS 110 may receive the clock manager control information 420 from the clock manager 106*b*. The clock manager control information 420 may comprise at least two types of information. The first type of information is clock adjustments to the clock 108*b*, such as phase adjustments and/or frequency adjustments. In this example, assume the first type of information comprises a frequency adjustment 620. The second type of information is an actual time offset value 624 or time information (e.g., timestamps) to calculate the actual time offset value 624. The actual time offset value 624 comprises a value representing an actual or measured total network delay (e.g., E2E or P2P delay) incurred as messages 112 traverse devices within the TSN 102 along a network path from the TSN node 104*a* to the TSN node 104*b*. The frequency adjustment 620 and/or the actual time offset value 624 can be calculated in real-time as messages 112 are received, or in non-real-time and stored in the data storage device 622.

The time offset estimator 602 may receive as input the frequency adjustment 620. The time offset estimator 602 can run the frequency adjustment 620 through the TSN system model 604. The TSN system model 604 is a physics-aware model of a time synchronization process for the TSN 102, as discussed in further detail below. The time offset estimator 602 takes a result from the TSN system model 604, and outputs an estimated time offset value 606. The estimated time offset value 606 comprises a value representing an estimated or predicted total network delay (e.g., E2E or P2P delay) that should be incurred as messages 112 traverse devices within the TSN 102 along a network path from the TSN node 104*a* to the TSN node 104*b*.

The comparator 608 may receive or retrieve an actual time offset value 624 for the message 112. The actual time offset value 624 may comprise a value between an actual sending time and an actual receiving time of the message 112. The comparator 608 may receive or retrieve an estimated time offset value 606 for the message 112. The estimated time offset value 606 may comprise a value between an estimated sending time and an estimated receiving time of the message 112. The comparator 608 may generate difference information 626 (or a residual signal) between the actual time offset value 624 and the estimated time offset value 606 for the message 112. The comparator 608 may output the difference information 626 to the analyzer 610.

The analyzer 610 may receive the difference information 626. The analyzer 610 may analyze the difference information 626 to determine whether the time information 418 for the message 112 has been modified to cause the first clock 108*a* and the second clock 108*b* to desynchronize based on results of the analysis of the difference information 626. For instance, the analyzer 610 may compare results of the analysis of the difference information 626 to one or more defined thresholds. The defined thresholds may represent an amplitude or deviance from expected results from benign time synchronization operations during normal operations of the TSN 102. In one embodiment, for example, a defined threshold may be set at 150 nanoseconds (ns). Embodiments are not limited to this example.

The analyzer 610 may continuously analyze the difference information 626 for potential security threats (e.g., a desynchronization attack). When the difference information 626 meets or exceeds a defined threshold, the analyzer 610 may output a signal to the alert generator 612 to generate an alert 614. The alert generator 612 may output the alert 614 when a security attack is suspected or confirmed, so that the devices in the TSN 102 may take corrective action (e.g., additional levels of security checks for devices, isolation of suspected malicious devices, temporary shutdown of devices, rebooting devices, and so forth).

Additionally, or alternatively, the analyzer 610 may output a request for crosscheck information 616. The IDS may output the crosscheck information 616 to confirm information carried by one or more messages 112 communicated within a TSN 102, 200 or 300, such as messages 112 sent from a device operating in a clock leader role and received by a device operating in a clock follower role.

Figure 7:
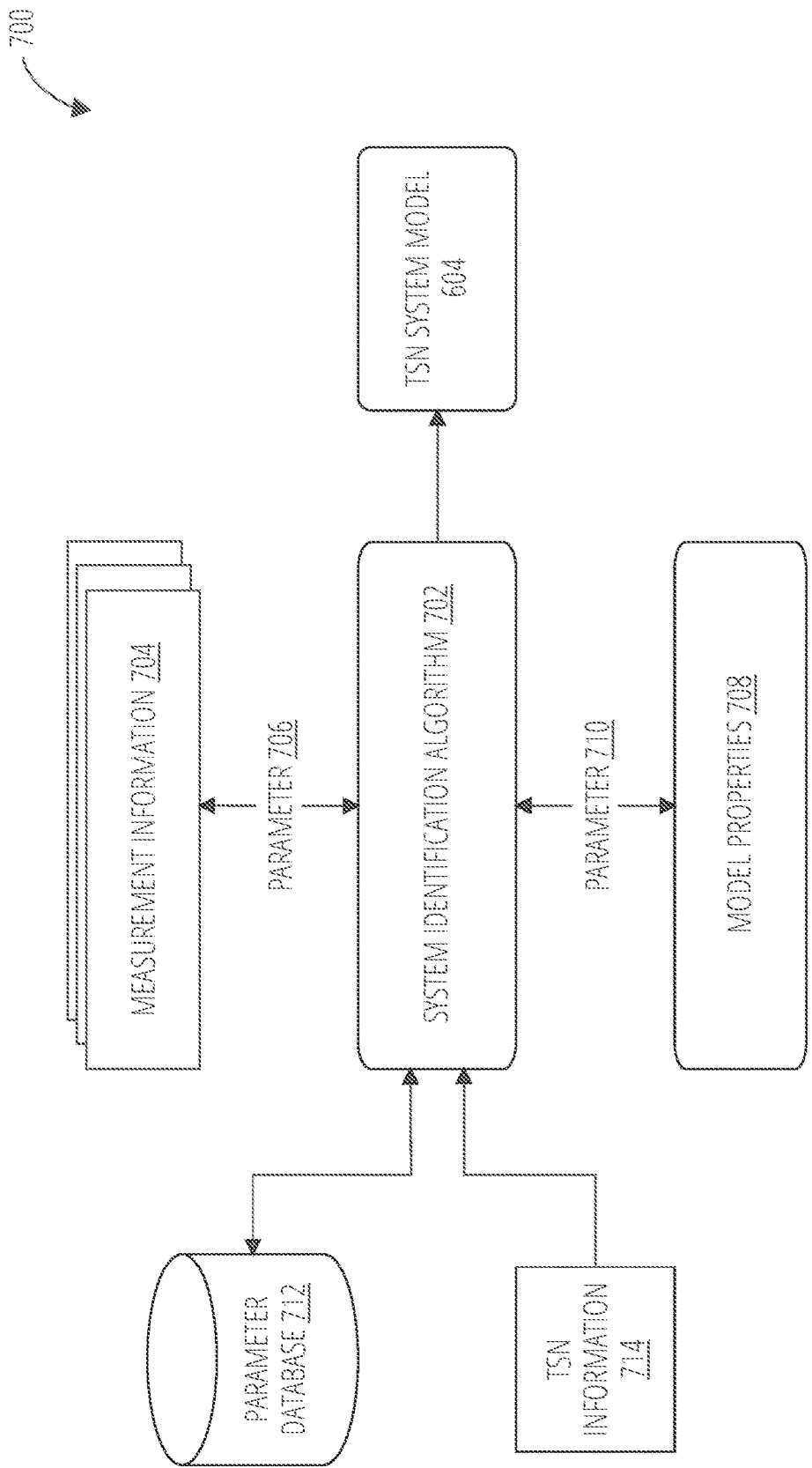
FIG. 7 illustrates an aspect of a system 700 in accordance with one embodiment.

FIG. 7 illustrates a system 700. The system 700 depicts components and information for a system to generate or construct a TSN system model 604 used by the IDS 110. As previously discussed, a conventional IDS may not be sensitive enough to detect time desynchronization attacks on devices within the TSN 102. This may occur, for example, when an attack amplitude of time offset bias is low enough to escape or evade detection during a single synchronization cycle but the accumulated time offset bias over multiple synchronization cycles is sufficient to desynchronize a TSN node or TSN application within the TSN 102. To solve these and other challenges in a TSN, the IDS 110 implements techniques to capture benign behavior of a time-synchronization process from a perspective of a TSN node within a TSN, such as from a clock follower node 206 perspective in a TSN, for example. The captured data is used to build a physics-aware view or model of the time-synchronization process.

As shown in FIG. 7, the system 700 comprises a system identification algorithm 702. The system identification algorithm 702 may receive or retrieve various parameters or TSN information 714 from other components, apparatus or system related to the TSN 102. The system identification algorithm 702 may also retrieve various parameters or TSN information 714 from a parameter database 712. For instance, the system identification algorithm 702 may receive a parameter 706 representing various measurement information 704 for the TSN 102. The measurement information 704 may comprise actual measurements taken for devices involved or related to a time synchronization process used by the TSN 102. The measurement information 704 represents benign behavior of the time synchronization process, which may operate as a benchmark for time synchronization operations for the TSN 102 or a TSN node 104 within the TSN 102. The system identification algorithm 702 may also receive a parameter 710 representing one or more model properties 708. The model properties 708 may comprise various properties associated with devices involved or related to the time synchronization process used by the TSN 102. The system identification algorithm 702 may analyze the parameters 706, 710, and output a TSN system model 604 suitable for a given TSN, such as the TSN 102.

The physics-aware model instantiated or represented by the TSN system model 604 may incorporate modeling strategies to unlock monitoring of dynamical behavior of the time-synchronization process. The physics-aware model captures behavioral aspects of a TSN whose outputs depends on inputs over time, e.g., a stateful process. The behavioral data is then translated into model attributes in order to obtain accurate predictions or estimates of various phases of the time-synchronization process. The physics-aware model is based on benign input/output data capturing various responses within a TSN based on excitations by capturing key dynamical responses features. An example response may include follower-to-leader time offset values for messages communicated within the TSN. An example of excitation may include clock adjustments, such as frequency or phase adjustments, made for a clock maintained by a clock follower node. An IDS may implement the physics-aware model, which may receive as input clock adjustments, generate estimated time offset values for one or more messages, and output the estimated time offset values. The estimated time offset values may be compared with actual time offset values to produce difference information, e.g., a residual signal. The IDS may analyze the residual signal based on a set of thresholds, generate an alert when the thresholds are met or exceeded, and take corrective actions in response to the alert. In some embodiments, for example, an IDS can use the physics-aware model to detect attacks introducing a time offset bias of approximately 150 ns per synchronization cycle.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 8:
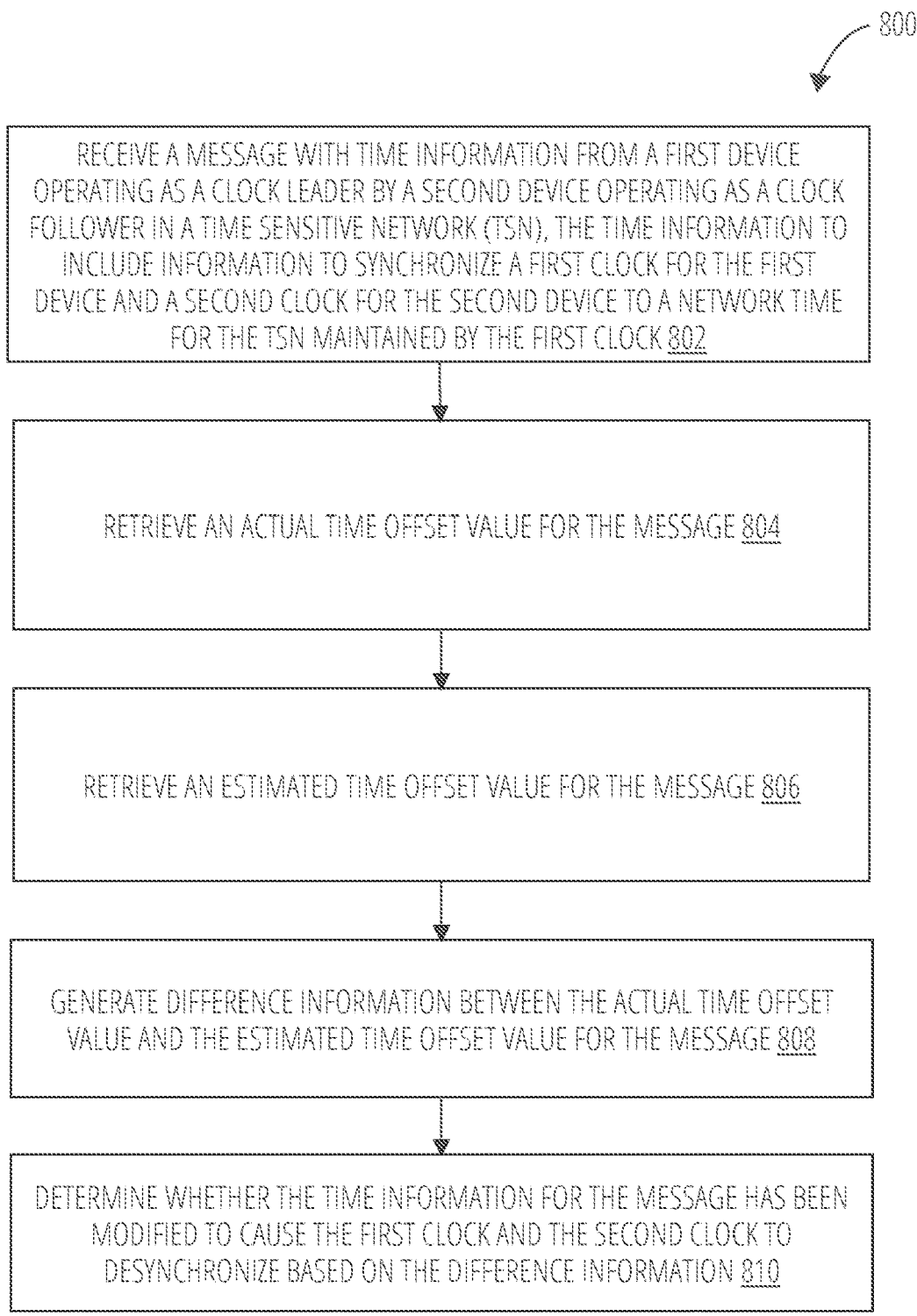
FIG. 8 illustrates a logic flow 800 in accordance with one embodiment.

FIG. 8 illustrates an embodiment of a logic flow 800. The logic flow 800 may be representative of some or all of the operations executed by one or more embodiments described herein. For example, the logic flow 800 may include some or all of the operations performed by devices or entities within the TSNs 102, 200 or 300, the TSN node 104, the IDS 110, the apparatus 500, as well as the system 600 or the system 700. More particularly, the logic flow 800 illustrates a use case where the IDS 110 detects a desynchronization attack on one or more TSN nodes 104 of the TSN 102. Embodiments are not limited in this context.

In block 802, logic flow 800 receives a message with time information from a first device operating as a clock leader by a second device operating as a clock follower in a time-synchronized network (TSN), the time information to include information to synchronize a first clock for the first device and a second clock for the second device to a network time for the TSN maintained by the first clock. For example, the TSN node 104b operating a clock follower in the TSN 102 may receive a message 112 with time information 418 from the TSN node 104a operating a clock leader for the TSN 102. The time information 418 may include information to synchronize a first clock 108a for the TSN node 104a and a second clock 108b for the TSN node 104b to a network time for the TSN 102 as maintained by the first clock 108a.

In block 804, logic flow 800 retrieves an actual time offset value for the message, the actual time offset value to comprise a value between an actual sending time and an actual receiving time of the message. For example, the IDS 110 implemented for the TSN node 104b may retrieve an actual time offset value 624 for the message 112. The actual time offset value 624 may comprise a value between an actual sending time and an actual receiving time of the message 112.

In block 806, logic flow 800 retrieves an estimated time offset value for the message, the estimated time offset value to comprise a value between an estimated sending time and an estimated receiving time of the message, the estimated time offset value generated using a physics-aware model of the TSN and a clock adjustment for the second clock based on the time information. For example, the time offset estimator 602 of the IDS 110 may retrieve a previously calculated estimated time offset value 606 for the message 112 from the data storage device 622. In this case, the time offset estimator 602 may generate the estimated time offset value 606 off-line or in non-real-time, potentially using data from multiple received messages 112. The time offset estimator 602 may store the pre-generated estimated time offset value 606 in the data storage device 622. Alternatively, the time offset estimator 602 may generate or calculate the estimated time offset value 606 for the message 112 in real-time. The estimated time offset value 606 may comprise a value between an estimated sending time and an estimated receiving time of the message 112.

The time offset estimator 602 may utilize the TSN system model 604 to generate the estimated time offset value 606. The TSN system model 604 may comprise a physics-aware model of one or more processes of the TSN 102, such as a clock synchronization process used by a given TSN protocol implemented for the TSN 102 (e.g., PTP, gPTP, etc.). The TSN system model 604 may receive as input a clock adjustment for the second clock 108b. For example, the clock manager 106b may generate clock manager control information 420 with clock adjustment information for the second clock 108b to adjust the clock circuitry 412 of the second clock 108b to synchronize the second clock 108b to the network time of the first clock 108a. In one embodiment, for example, the clock adjustment information may include a frequency adjustment 620 to adjust a frequency of the second clock 108b. The clock manager 106b may generate the clock manager control information 420 with the clock adjustment information based on time information 418 carried by one or more messages 112.

The TSN system model 604 implements a physics-aware model to detect time offset bias in messages 112 on the order of nanoseconds or microseconds per synchronization cycle. The physics-aware model is based on analytical or mathematical principles that model a time-synchronization process as a closed-loop control system. In a closed-looped control system, time offset measurements invoke clock adjustment, such as frequency adjustment, computation and actuation. This in turn affects a next measured time offset value. Mathematically characterizing a controlled variable as a function of excitation input produces a model of a controlled process.

In one embodiment, the TSN system model 604 may mathematically characterize a time offset as a function of a frequency adjustment to produce a model of a closed-loop control system, where the closed-loop control system is a time-synchronization process within a TSN 102. The TSN system model 604 may receive as input the frequency adjustment 620, calculate the estimated time offset value 606 using the mathematical function, and output the estimated time offset value 606. The estimated time offset value 606 may comprise an estimated or predicted value for time offset between an estimated sending time and an estimated receiving time of the message 112.

In block 808, logic flow 800 generates difference information between the actual time offset value and the estimated time offset value for the message. For example, the comparator 608 of the IDS 110 receives as input both the actual time offset value 624 and the estimated time offset value 606. The comparator 608 compares both values, and it generates difference information 626 between the actual time offset value 624 and the estimated time offset value 606 for the message 112. The comparator 608 outputs the difference information 626 to the analyzer 610 of the IDS 110.

In block 810, logic flow 800 determines whether the time information for the message has been modified to cause the first clock and the second clock to desynchronize based on the difference information. For example, the analyzer 610 of the IDS 110 receives as input the difference information 626 from the comparator 608. The analyzer 610 analyzes the difference information 626, and it determines whether the time information 418 for the message 112 has been modified to cause the first clock 108a and the second clock 108b to desynchronize based on the analysis of the difference information 626.

In various embodiments, the logic flow 800 may further include calculating estimated time offset value 606 based on a TSN system model 604, where the TSN system model 604 is a physics-aware model of the TSN 102 is based on a model of a time synchronization process for the TSN 102 as a closed loop control system. The TSN system model 604 may comprise a model to mathematically characterize time offset values as a function of clock adjustments, where the time offset values are controlled variables and the clock adjustments are excitation inputs, in order to produce the model as a controlled process or plant model of the TSN 102.

In various embodiments, the logic flow 800 may further include receiving or collecting a set of actual time offset values 624 indicating actual amounts of time delays incurred by messages 112 as the messages 112 traverse one or more TSN nodes 104 of the TSN 102 during normal operations of the TSN 102. The logic flow 800 may identify a physics-aware model of the TSN 102 based on the set of actual time offset values 624.

In various embodiments, the logic flow 800 may further include identifying the physics-aware model of the TSN 102 for a defined time interval as measured between an initial set of unknown conditions for the TSN 102 and when the TSN 102 reaches a steady state as indicated by a standard deviation of time offset values.

In various embodiments, the logic flow 800 may further include identifying the physics-aware model of the TSN 102 for a defined time interval as measured between an initial set of unknown conditions for the TSN 102 and when the TSN 102 reaches a steady state as indicated by a standard deviation of time offset values, where the defined time interval is less than or equal to 5 seconds, and where the standard deviation of time offset values is less than or equal to 150 nanoseconds.

In various embodiments, the logic flow 800 may further include performing a handshake protocol between a clock leader node (e.g., TSN node 104a) and a clock follower node (e.g., TSN node 104b) to reduce an identifying time or convergence time for the physics-aware model of the TSN.

In various embodiments, the logic flow 800 may further include identifying the physics-aware model of the TSN 102 based on one or more dynamical properties of the TSN 102, where one of the dynamical properties of a clock synchronization process for the TSN is bounded-input-bounded-output (BIBO) instability, where a bounded input does not always produce a bounded output, the bounded input to comprise a clock adjustment to the second clock 108b, and the bounded output to comprise a time offset value for a message 112.

In various embodiments, the logic flow 800 may further include identifying the physics-aware model of the TSN 102 based on one or more dynamical properties of the TSN 102, where one of the dynamical properties of a clock synchronization process for the TSN 102 is a homogeneous or unforced response featuring an increasing component.

In various embodiments, the logic flow 800 may further include identifying the physics-aware model of the TSN 102 based on one or more dynamical properties of the TSN 102, where one of the dynamical properties of a clock synchronization process for the TSN 102 is a presence of an overshoot of a time offset value in a closed-loop clock convergence phase due to a transient.

In various embodiments, the logic flow 800 may further include identifying the physics-aware model of the TSN 102 based on one or more dynamical properties of the TSN 102, where one of the dynamical properties of a clock synchronization process for the TSN 102 is a presence of a higher order oscillatory behavior.

In various embodiments, the logic flow 800 may further include determining a transfer function from an input of a clock adjustment to an output of a time offset value based on data collected from a set of nominal or benign runs of messages 112 communicated within the TSN 102.

In various embodiments, the logic flow 800 may further include determining whether the time information 418 for the message 112 has been modified to cause the first clock 108a and the second clock 108b to desynchronize based on the residual value, where the residual value is a value greater than 150 nanoseconds.

In various embodiments, the logic flow 800 may further include requesting information from the TSN node 104a by the TSN node 104b to crosscheck one or more estimated time offset values generated by the physics-aware model of the TSN 102 using an authenticated type-length-value (TLV) communications protocol between the TSN node 104a and the TSN node 104b, the TLV to prevent tampering with message content of a message communicated between the TSN node 104a and the TSN node 104b.

In various embodiments, the logic flow 800 may further include generating an alert of a security attack within the TSN 102 when the time information 418 for the message 112 has been determined to be modified to cause the first clock 108a and the second clock 108b to desynchronize based on the difference information 626.

Figure 9A:
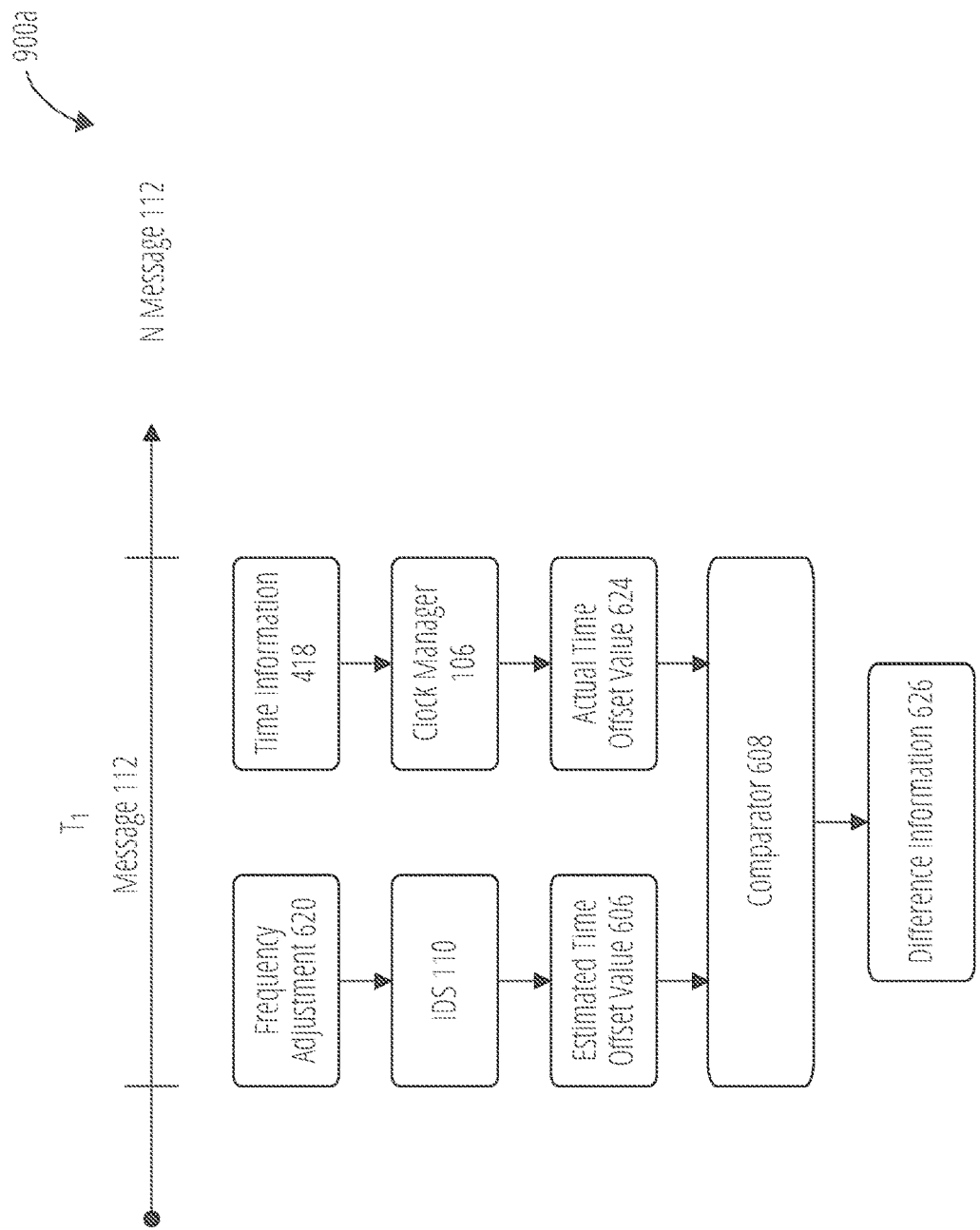
FIG. 9A illustrates an aspect of an operating environment 900a in accordance with one embodiment.

FIG. 9A illustrates an example of an operating environment 900a for a TSN node 104 and an IDS 110 monitoring the TSN node 104 to detect a security attack based on time offset bias. Examples of attacks may include those attacks made external to the TSN node 104, such as a timing attack, a desynchronization attack, and other types of attacks to other TSN nodes 104 in the TSN 102, such as relay nodes, switch nodes, clock leader nodes, and so forth.

As previously discussed, the clock manager 106 may calculate an actual time offset value 624 based on time information 418 carried by one or more messages 112 or associated with one or more messages 112. In various embodiments, the time information 418 may comprise at least three types of time information, each of which comprise actual or measured time information related to the message 112. A first type of time information 418 includes a sending timestamp for the message 112. The sending timestamp is generated by the TSN node 104a which is operating as a clock leader for the TSN node 104b. The sending timestamp represents an actual time a message 112 is sent by the TSN node 104a (e.g., an egress time). The second type of time information 418 may include a receiving timestamp for the message 112. The receiving timestamp represents an actual time the message 112 is received from the TSN node 104a by the TSN node 104b (e.g., an ingress time). The third type of time information 418 may include a network delay value for the message 112. The network delay value represents an actual amount of time delay incurred by the message 112 as it traversed one or more TSN nodes 104 along a network path between the TSN node 104a and the TSN node 104b in the TSN 102.

In one embodiment, the clock manager 106 may calculate an actual time offset value 624 based on time information 418 carried by a single message 112 or associated with a single message 112. The operating environment 900a depicts an example where a message 112 contains sufficient time information 418 to calculate an actual time offset value 624 for the IDS 110. For instance, the transceiver 410 of the hardware platform 408 of the TSN node 104b may receive a message 112 at time $T_1$. The message 112 may include a sending timestamp generated by the TSN node 104a. To calculate the actual time offset value 624, the clock manager 106 may retrieve the sending timestamp from the message 112, where the sending timestamp indicates the actual sending time of the message 112. The clock manager 106 may also retrieve a network delay value (e.g., a path delay or pDelay value) to indicate an actual amount of time delay incurred by the message 112 as it traversed one or more TSN nodes 104 in the TSN 102. The network delay value may also be carried by the message 112. The clock manager 106 may then retrieve a receiving timestamp to indicate the actual receiving time of the message 112 by the TSN node 104b. The clock manager 106 may generate the actual time offset value 624 for the message 112 as a value between the sending timestamp and the receiving timestamp minus the network delay value. The clock manager 106 may output the actual time offset value 624 to the comparator 608.

At approximately the same time, in parallel or in sequence, the IDS 110 may receive as input a clock adjustment value such as the frequency adjustment 620, generate an estimated time offset value 606 using the TSN system model 604, and output the estimated time offset value 606 to the comparator 608. Note the frequency adjustment 620 may be based on time information 418 for the message 112 received at time $T_1$, or alternatively, time information 418 from a message 112 received prior to time $T_1$.

The comparator 608 may compare the two values, and output difference information 626 to the analyzer 610. The analyzer 610 may determine whether an attack is occurring, and generate a signal to the alert generator 612 to generate an alert 614.

Figure 9B:
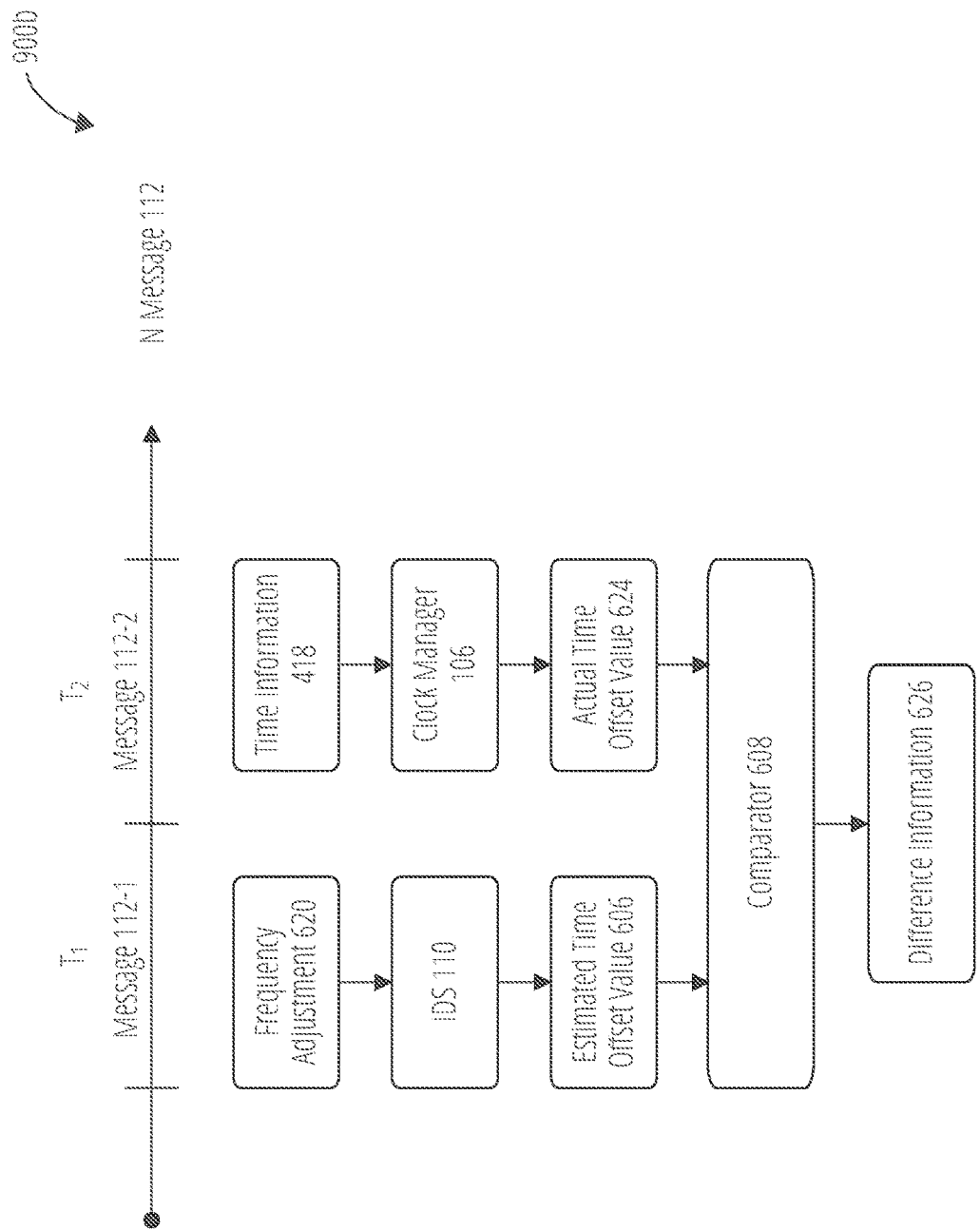
FIG. 9B illustrates an aspect of an operating environment 900b in accordance with one embodiment.

FIG. 9B illustrates an example of an operating environment 900b for a TSN node 104 and an IDS 110 monitoring the TSN node 104 to detect a security attack based on time offset bias. Examples of attacks may include those attacks made external to the TSN node 104, such as a timing attack, a desynchronization attack, and other types of attacks to other TSN nodes 104 in the TSN 102, such as relay nodes, switch nodes, clock leader nodes, and so forth.

As previously discussed, the clock manager 106 may calculate an actual time offset value 624 based on time information 418 carried by one or more messages 112 or associated with one or more messages 112. In various embodiments, the time information 418 may comprise at least three types of time information, including a sending timestamp for the message 112, a receiving timestamp for the message 112, and a network delay value for the message 112. As depicted in FIG. 9B, the clock manager 106 may generate an actual time offset value for a message 112 based on a sending timestamp for the actual sending time of the message 112 as carried by another message 112.

In one embodiment, the clock manager 106 may calculate an actual time offset value 624 based on time information 418 carried by multiple messages 112 or associated with multiple messages 112. The operating environment 900b depicts an example where a single message 112 does not contain sufficient time information 418 to calculate an actual time offset value 624 for the IDS 110. For instance, the transceiver 410 of the hardware platform 408 of the TSN node 104b may receive a message 112-1 at time $T_1$. The message 112-1 does not include a sending timestamp generated by the TSN node 104a. Rather, the sending timestamp for the message 112-1 is actually carried by a message 112-2 received at time $T_2$. In this case, to calculate the actual time offset value 624 for the message 112-1, the clock manager 106 may retrieve the sending timestamp from the message 112-2, where the sending timestamp indicates the actual sending time of the message 112-1. The clock manager 106 may also retrieve a network delay value (e.g., a path delay or pDelay value) to indicate an actual amount of time delay incurred by the message 112-1 as it traversed one or more TSN nodes 104 in the TSN 102. The network delay value may be carried by the message 112-1 or the message 112-2. The clock manager 106 may then retrieve a receiving timestamp to indicate the actual receiving time of the message 112 by the TSN node 104b. The clock manager 106 may generate the actual time offset value 624 for the message 112 as a value between the sending timestamp and the receiving timestamp minus the network delay value. The clock manager 106 may output the actual time offset value 624 to the comparator 608.

At approximately the same time, in parallel or in sequence, the IDS 110 may receive as input a clock adjustment value such as the frequency adjustment 620, generate an estimated time offset value 606 using the TSN system model 604, and output the estimated time offset value 606 to the comparator 608. Note the frequency adjustment 620 may be based on time information 418 for the message 112-1 received at time $T_1$, or alternatively, time information 418 from a message 112-0 (not shown) received prior to time $T_1$.

For example, the time offset estimator 602 of the IDS 110 may generate an estimated time offset value 606 for a message 112 using a TSN system model 604, which is a physics-aware model of the TSN 102, based on a clock adjustment for the second clock 108b. The clock adjustment may comprise, for example, a frequency adjustment 620 to adjust a frequency for the second clock 108b of the TSN node 104b to synchronize the second clock 108b to a network time of the first clock 108a.

Similar to the procedure for generating an actual time offset value 624, the time offset estimator 602 may generate an estimated sending time of the message. The time offset estimator 602 may also generate an estimated network delay value to indicate an estimated amount of time delay incurred by the message 112 as it traversed one or more TSN nodes in the TSN 102. The time offset estimator 602 may generate an estimated receiving time of the message 112, and generate the estimated time offset value 606 for the message 112 as a value between the estimated sending time and the estimated receiving time minus the estimated network delay value. The estimates may be built into the TSN system model 604, or alternatively, may comprise stored parameters retrieved from the data storage device 622 or the parameter database 712.

The comparator 608 may compare the two values, and output difference information 626 to the analyzer 610. The analyzer 610 may determine whether an attack is occurring, and generate a signal to the alert generator 612 to generate an alert 614.

Figure 10:
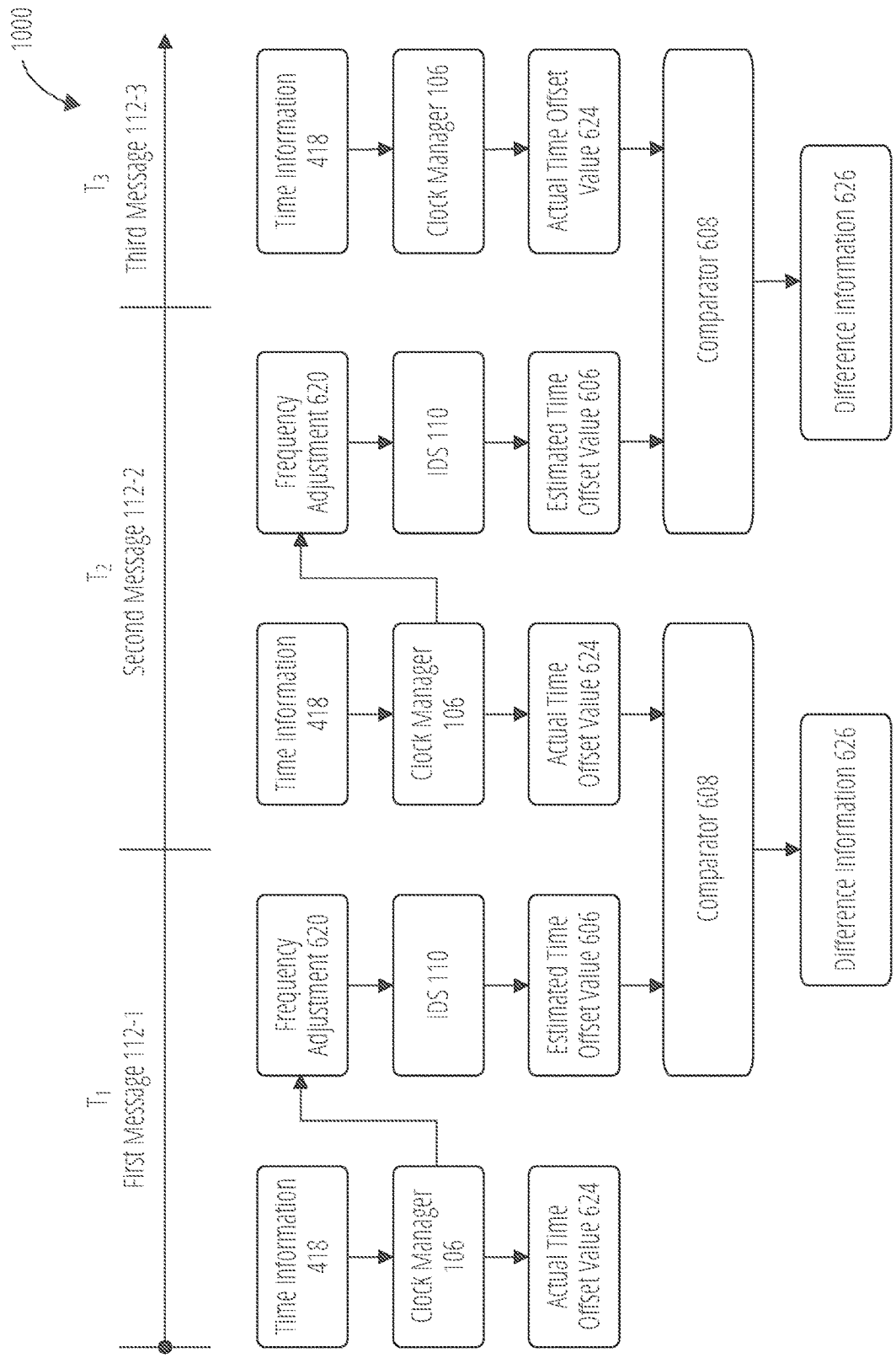
FIG. 10 illustrates an aspect of an operating environment 1000 in accordance with one embodiment.

FIG. 10 illustrates an example of an operating environment 1000 for a TSN node 104 and an IDS 110 monitoring the TSN node 104 to detect a security attack based on time offset bias. Examples of attacks may include those attacks made external to the TSN node 104, such as a timing attack, a desynchronization attack, and other types of attacks to other TSN nodes 104 in the TSN 102, such as relay nodes, switch nodes, clock leader nodes, and so forth.

As previously discussed, the clock manager 106 may calculate an actual time offset value 624 based on time information 418 carried by one or more messages 112 or associated with one or more messages 112. In various embodiments, the time information 418 may comprise at least three types of time information, including a sending timestamp for the message 112, a receiving timestamp for the message 112, and a network delay value for the message 112. FIG. 9A illustrates an operating environment 900a where a sending timestamp for a message 112 is carried by the message 112. FIG. 9B illustrates an operating environment 900b where a sending timestamp for the message 112 (e.g., message 112-1) is carried by another message 112 (e.g., message 112-2). In both cases, the sending timestamp is used to calculate an actual time offset value 624 for a current message 112.

FIG. 10 illustrates an operating environment 1000 where an estimated time offset value 606 is calculated based on time information 418 from a previous message 112 for application to a future message 112. As depicted in FIG. 10, the clock manager 106 may generate an actual time offset value for a message 112 based on a sending timestamp for the actual sending time of the message 112 as carried by the message 112. By way of contrast, the IDS 110 may receive a frequency adjustment 620 from the clock manager 106 that is not based on time information 418 carried by the same message 112 and used to calculate the actual time offset value 624 for the message 112. Rather, the IDS 110 may calculate an estimated time offset value 606 using a frequency adjustment 620 generated from time information 418 retrieved or associated with a previous message 112.

The operating environment 1000 depicts a TSN node 104 operating as a clock follower (e.g., TSN node 104b) receiving a first message 112-1 at time $T_1$. At time $T_1$, the clock manager 106 retrieves time information 418 from the message 112-1, and generates an actual time offset value 624 for the message 112-1. The clock manager 106 outputs a clock adjustment such as frequency adjustment 620 to the IDS 110. The IDS 110 generates an estimated time offset value 606 based on the frequency adjustment 620 calculated from time information 418 from the first message 112-1.

The TSN node 104b then receives a second message 112-2 at time $T_2$. At time $T_2$, the clock manager 106 retrieves time information 418 from the message 112-2, and generates an actual time offset value 624 for the message 112-2. The clock manager 106 outputs a clock adjustment such as frequency adjustment 620 to the IDS 110. The IDS 110 generates an estimated time offset value 606 based on the frequency adjustment 620 calculated from time information 418 from the second message 112-2.

The comparator 608 computes difference information 626 based on time information 418 received by two different messages, namely message 112-1 and 112-2. At time $T_1$, the comparator 608 receives as input the estimated time offset value 606 generated based on time information 418 associated with the first message 112-1. At time $T_2$, the comparator 608 receives as input the actual time offset value 624 for the second message 112-2. The comparator 608 compares both values, and outputs difference information 626.

Similarly, the comparator 608 computes difference information 626 based on time information 418 received by two different messages, namely message 112-2 and message 112-3. At time $T_2$, the comparator 608 receives as input the estimated time offset value 606 generated based on time information 418 associated with the second message 112-2.

At time $T_3$, the comparator 608 receives as input the actual time offset value 624 for the third message 112-3. The comparator 608 compares both values, and outputs difference information 626. This procedure continues for subsequent messages 112-N.

Figure 11:
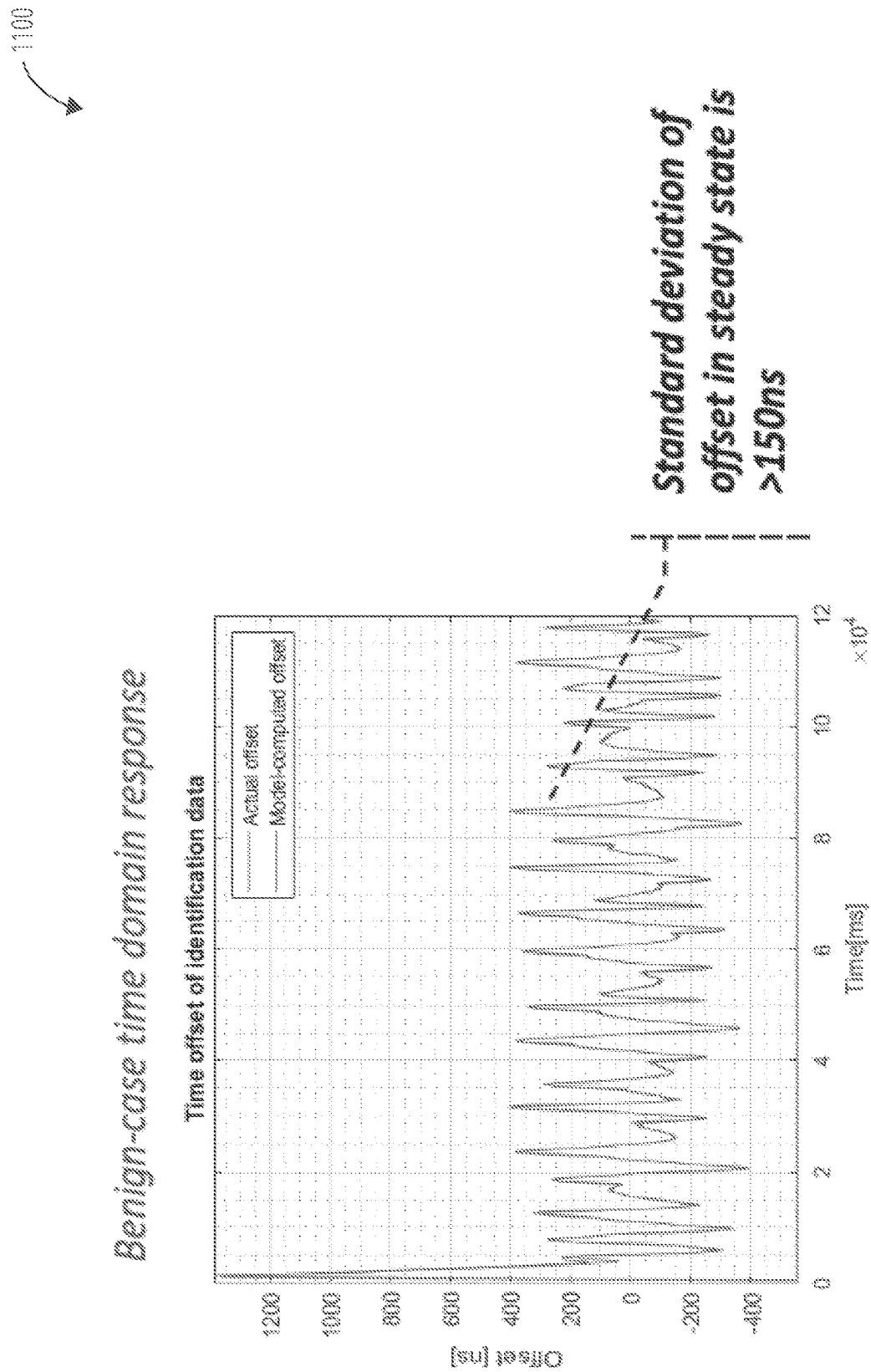
FIG. 11 illustrates an aspect of a graph 1100 in accordance with one embodiment.

FIG. 11 illustrates a graph 1100 representing a model response analysis of an IDS 110 implementing a TSN system model 604 to detect a security attack. The graph 1100 illustrates an x-axis of time in milliseconds, and a y-axis of time offset in nanoseconds. The graph 1100 illustrates a benign-case of time domain response for a time synchronization process for the TSN 102.

As a time offset is initially unknown, the TSN system model 604 needs a certain amount of time to converge from zero initial conditions. For example, the TSN system model 604 may take approximately 5 seconds to converge from zero initial conditions. The convergence time could be narrowed with a pre-run handshake procedure between a clock leader and a clock follower.

Apart from the unknown set of initial conditions, the TSN system model 604 may produce an estimated time offset value 606 with a prediction accuracy of approximately 100-150 nanoseconds. Once the TSN system model 604 reaches a steady state, the TSN system model 604 produces estimated time offset values 606 with a standard deviation of greater than 150 nanoseconds, such as a range between −400 nanoseconds to +400 nanoseconds.

Figure 12:
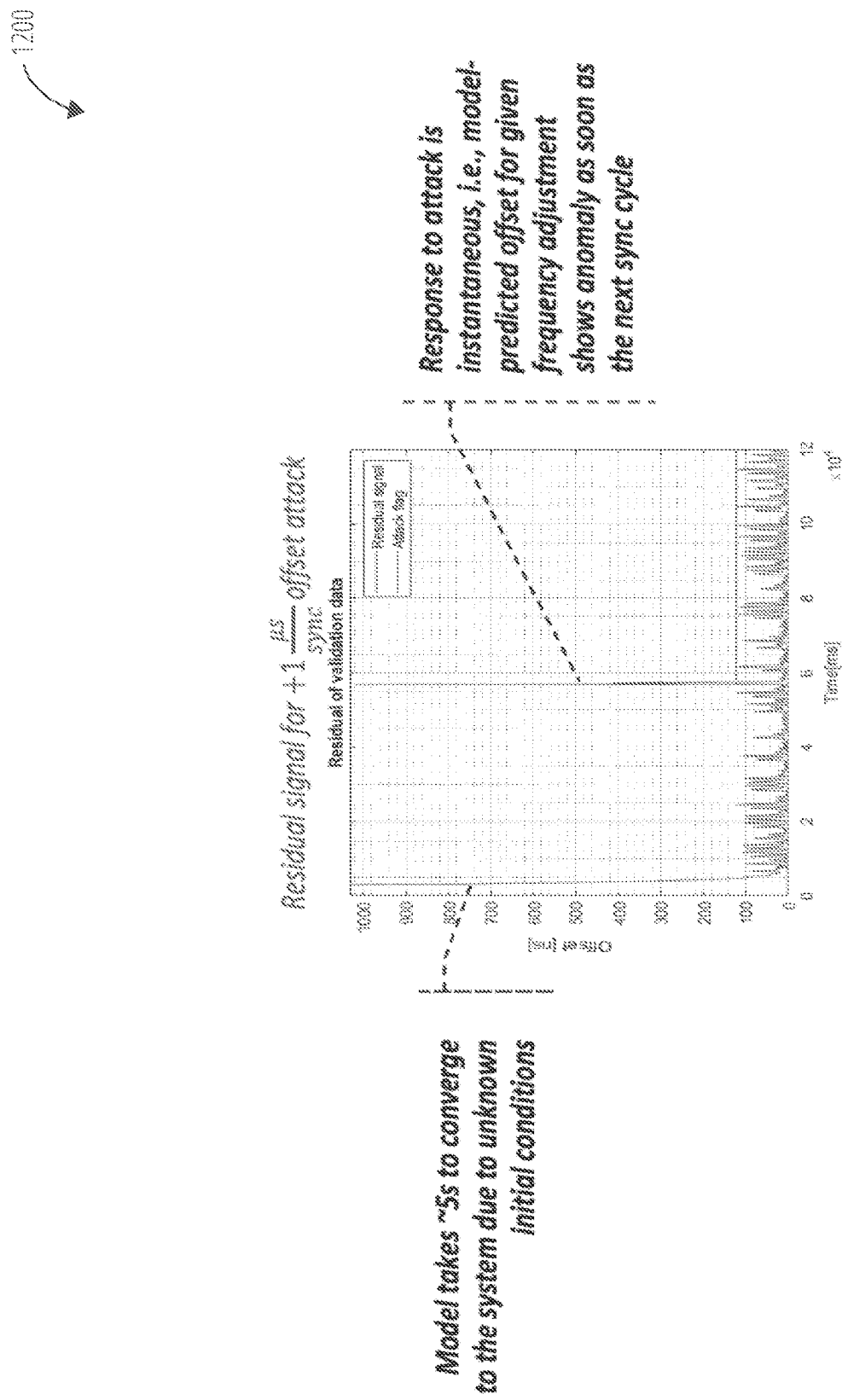
FIG. 12 illustrates a graph 1200 in accordance with one embodiment.

FIG. 12 illustrates a graph 1200 representing another model response analysis of an IDS 110 implementing a TSN system model 604 to detect a security attack. The graph 1200 illustrates an x-axis of time in milliseconds, and a y-axis of time offset in nanoseconds. The graph 1200 illustrates a case where a residual signal for a +1 microsecond per synchronization cycle attack. As depicted in the graph 1200, a response to an attack is nearly instantaneous. An estimated time offset value 606 for a given frequency adjustment 620 shows anomalous behavior as soon as a next synchronization cycle.

Figure 13:
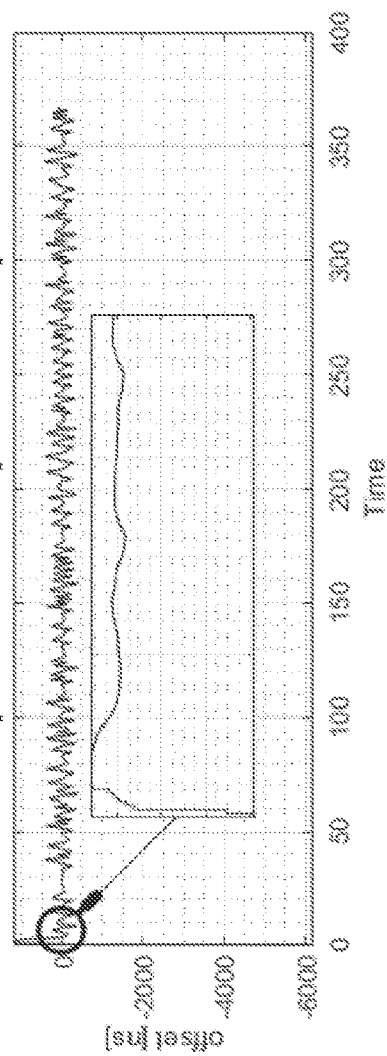
FIG. 13 illustrates a graph 1300 in accordance with one embodiment.

FIG. 13 illustrates a graph 1300 representing an example of a closed loop offset response for a TSN system model 604. Output response characterizes plant dynamics. Key dynamical properties of PTP synchronization are: (1) the clock synchronization process is bounded-input-bounded-output (BIBO) unstable: where a bounded input (frequency adjustment 620) does not always produce bounded output (estimated time offset value 606); (2) a homogenous (unforced) response has an increasing component; (3) an offset overshoot is present in the (closed-loop) clock convergence phase (transient); and (4) a higher order oscillatory behavior is present. For instance, transfer functions (input-output mapping in frequency domain) can capture this dynamical behavior by careful placement of a sufficient number of poles and zeros. For a discrete implementation (practical case), properly placed 4 poles and 2 zeroes can efficiently describe the dynamical dependency of follower-to-leader offset on local frequency adjustments.

Figure 14:
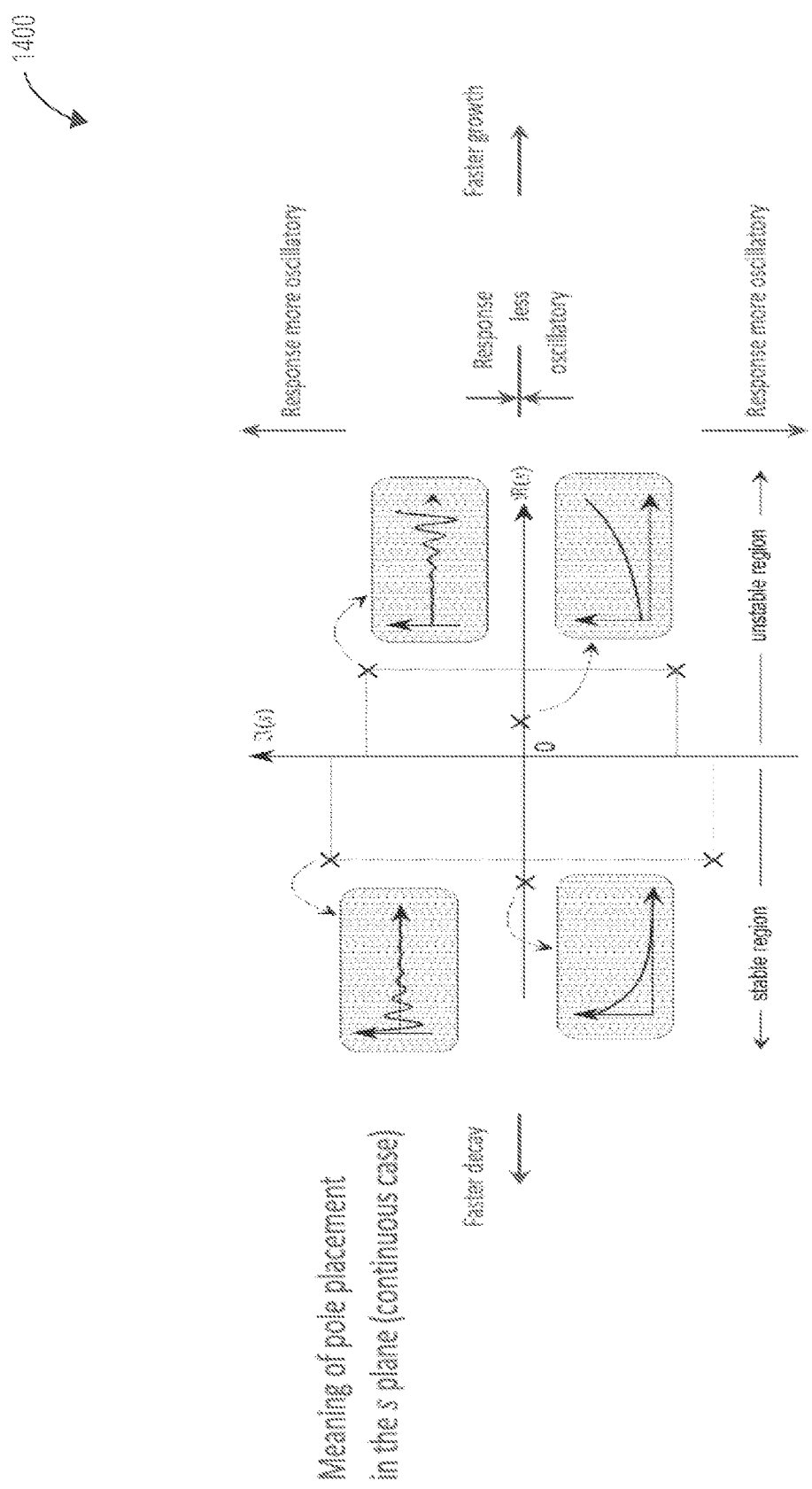
FIG. 14 illustrates a graph 1400 in accordance with one embodiment.

FIG. 14 illustrates a graph 1400 describing a meaning of pole placement in an S plane (e.g., continuous case). For instance, transfer functions (input-output mapping in frequency domain) can capture the dynamical behavior by careful placement of a sufficient number of poles and zeros, as shown in Equation (1) as follows:

$$H(s) = \frac{K(s-z_1)\ldots(s-z_{m-1})(s-z_m)}{(s-p_1)\ldots(s-p_{n-1})(s-p_n)} \quad \text{EQUATION (1)}$$

For a discrete implementation (practical case), properly placed 4 poles and 2 zeroes can efficiently describe the dynamical dependency of follower-to-leader offset on local frequency adjustments.

A Matlab System Identification toolbox can be used to determine zero/pole placement for a transfer function from an input frequency adjustment $f_i[k]$ to an output estimated time offset value $o_i[k]$, as shown in Equation (2) as follows:

$$O_i(z) = H_i(z)F_i(z) \quad \text{EQUATION (2)}$$

An example experimental architecture for a TSN 102 implementing an IEEE 802.1AS time protocol may comprise one clock leader, two relay nodes, and one clock follower on each of the relay nodes. In the experimental architecture, assuming a periodicity of synchronization messages is 125 milliseconds, an obtained transfer function on each of the clock followers are shown in Equation (3) and Equation (4) as follows:

$$H_1(z) = \frac{0.4035z^{-1} - 0.4035z^{-2}}{1 - 1.742z^{-1} + 1.19z^{-2} - 0.3916z^{-3} + 0.007034z^{-4}} \quad \text{EQUATION (3)}$$

$$H_2(z) = \frac{0.5244z^{-1} - 0.5244z^{-2}}{1 - 1.63z^{-1} + 1.163z^{-2} - 0.4399z^{-3} + 0.01569z^{-4}} \quad \text{EQUATION (4)}$$

Figure 15A:
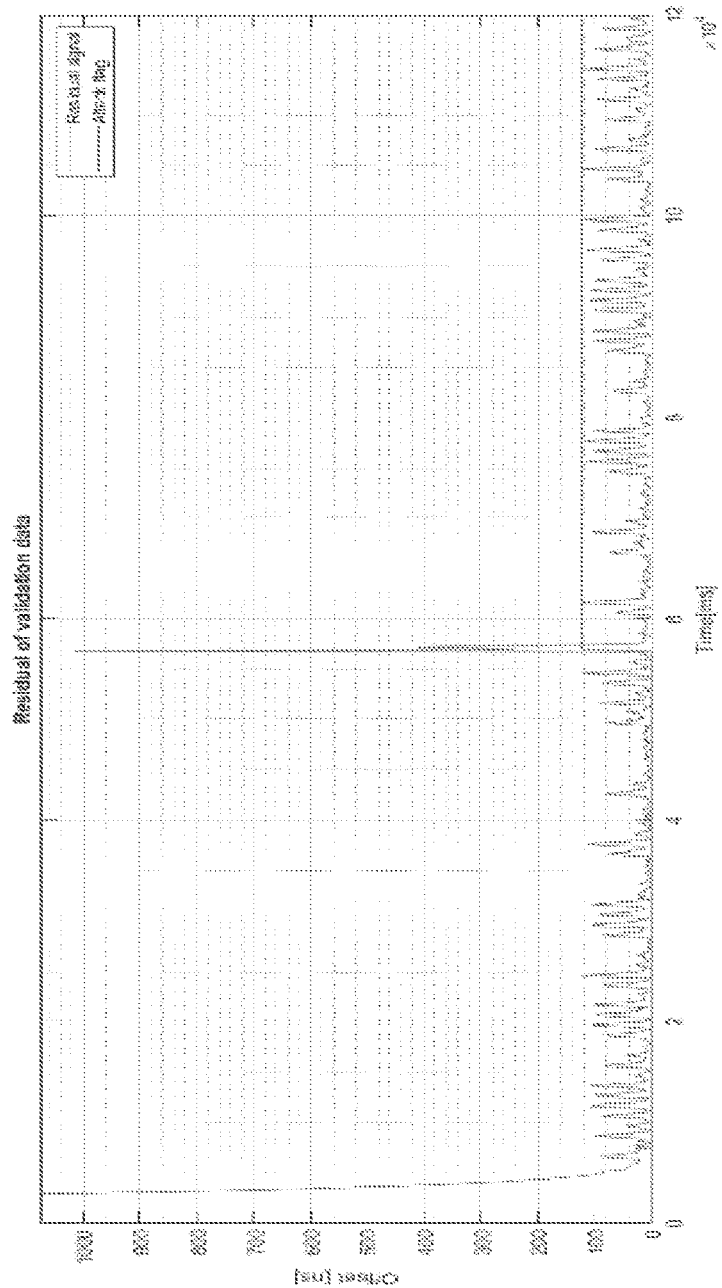
FIG. 15A illustrates a graph 1500a in accordance with one embodiment.

FIG. 15A illustrates a graph 1500a representing a residual of validation data. The graph 1500a illustrates an x-axis of time in milliseconds, and a y-axis of time offset in nanoseconds. The graph 1500a illustrates a case where the TSN 102 is subject to a ±1 microseconds/synchronization cycle time offset bias attack.

Figure 15B:
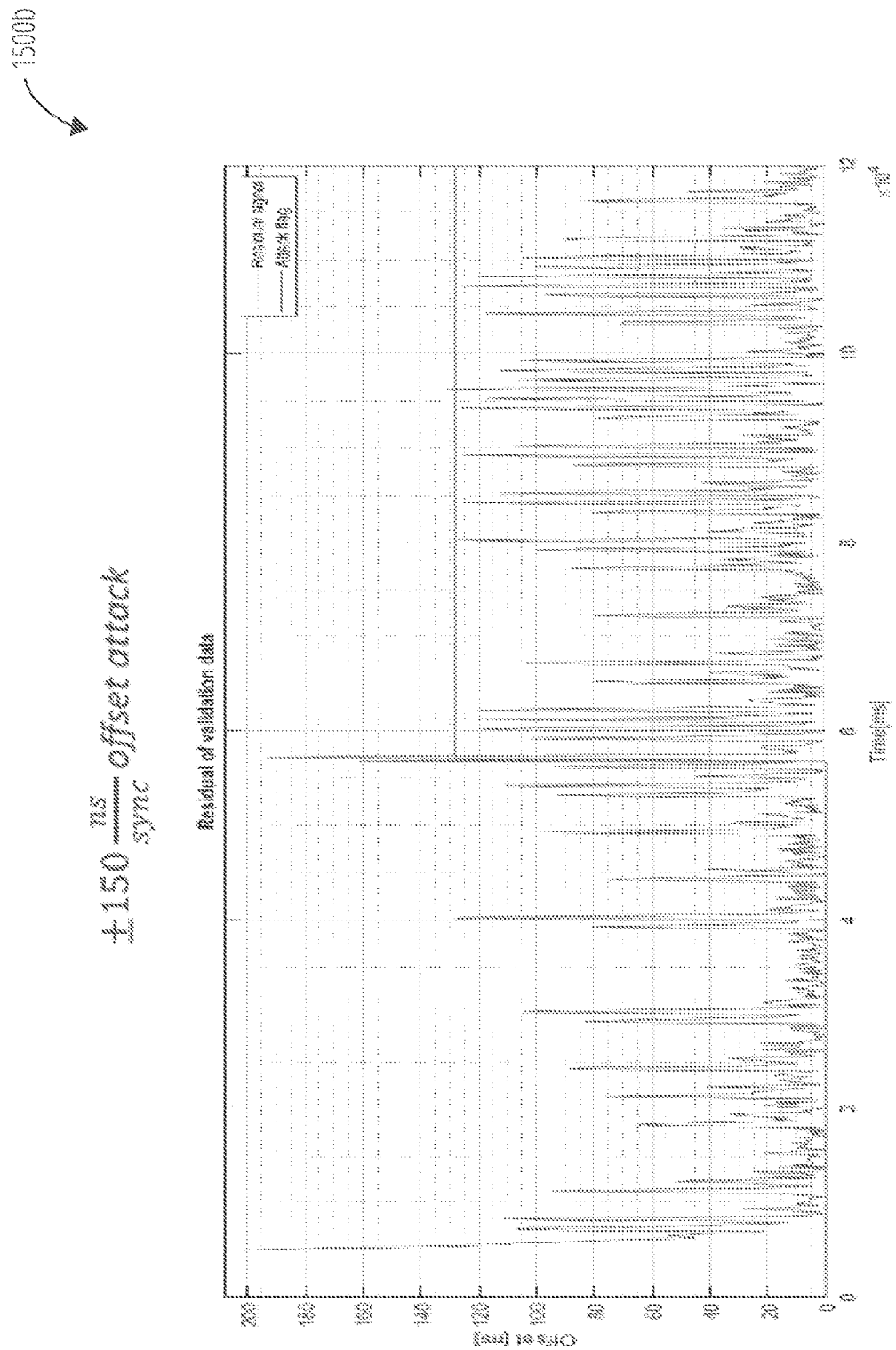
FIG. 15B illustrates a graph 1500b in accordance with one embodiment.

FIG. 15B illustrates a graph 1500b representing a residual of validation data. The graph 1500b illustrates an x-axis of time in milliseconds, and a y-axis of time offset in nanoseconds. The graph 1500b illustrates a case where the TSN 102 is subject to a ±150 nanoseconds/synchronization cycle time offset bias attack.

Figure 15C:
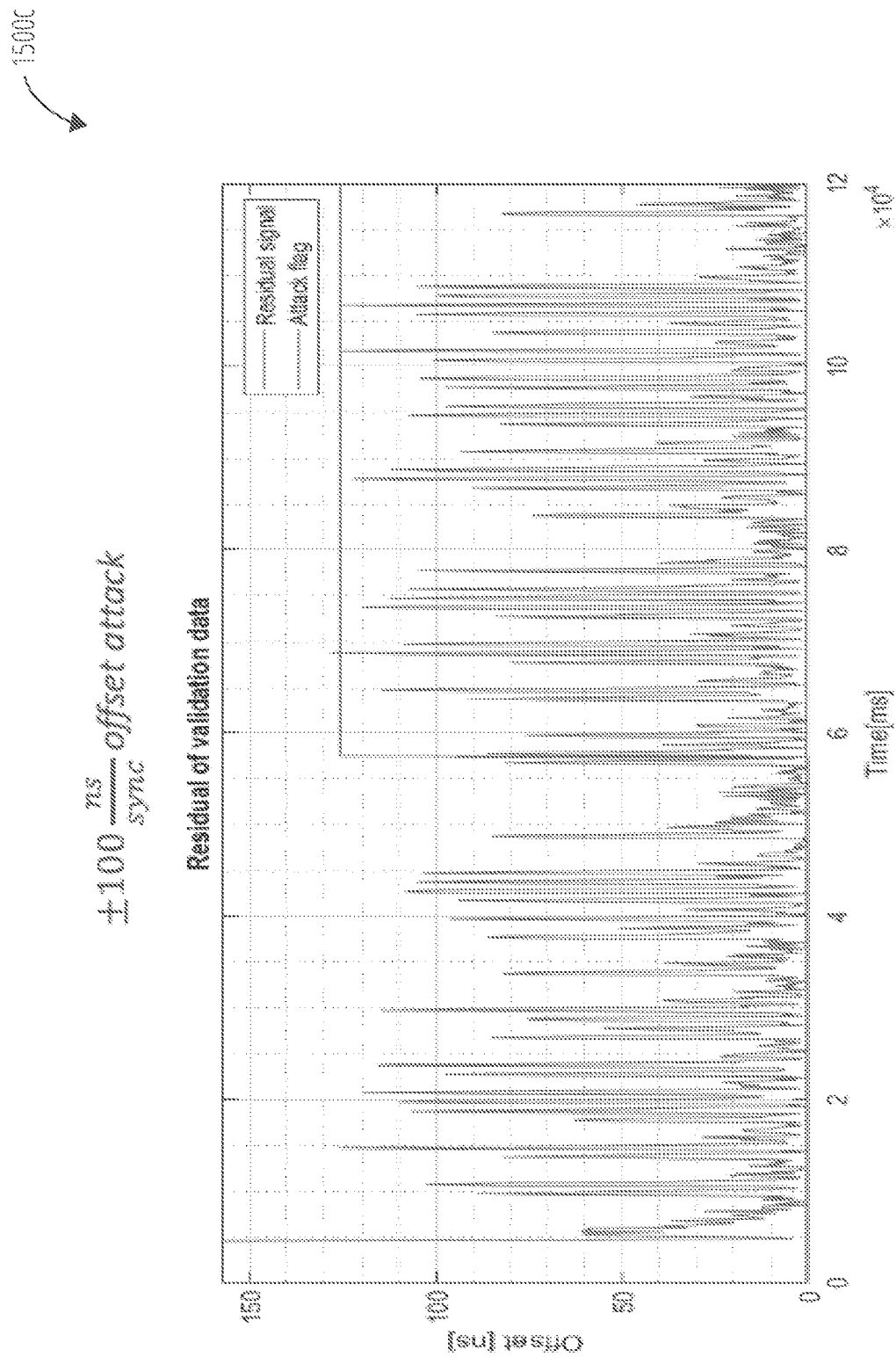
FIG. 15C illustrates a graph 1500c in accordance with one embodiment.

FIG. 15C illustrates a graph 1500c representing a residual of validation data. The graph 1500c illustrates an x-axis of time in milliseconds, and a y-axis of time offset in nanoseconds. The graph 1500c illustrates a case where the TSN 102 is subject to a ±100 nanoseconds/synchronization cycle time offset bias attack. It is worthy to note that this type of attack is difficult to detect since a standard deviation of actual time offset values is greater than 150 nanoseconds in a steady state. In order to deal with attacks having less than 150 nanoseconds/synchronization cycle time offset bias attacks, the IDS 110 may implement an offset crosscheck technique with E2E authenticated TLV, as described in more detail with reference to FIG. 16.

Figure 16:
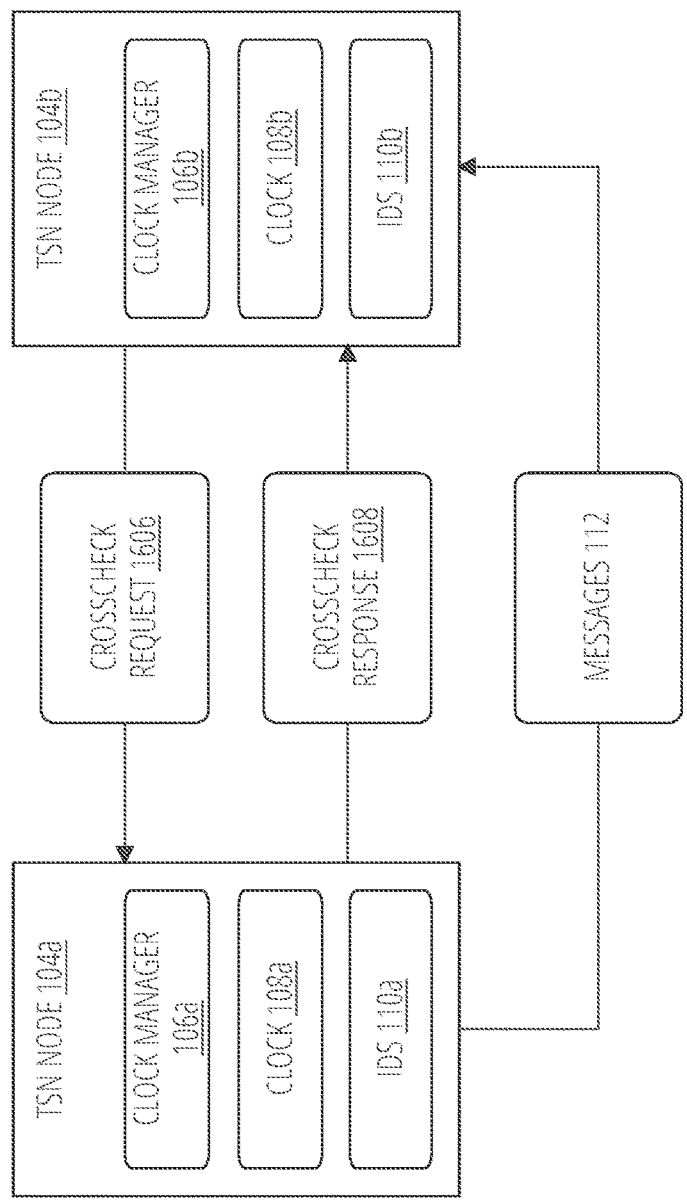
FIG. 16 illustrates an aspect of a system 1600 in accordance with one embodiment.

FIG. 16 illustrates a system 1600. The system 1600 depicts communications between a pair of TSN nodes 104a, 104b in the TSN 102. The TSN node 104a operates in a clock leader role 1602. In the clock leader role 1602, the TSN node 104a sends messages 112 with time information 418 representing a network time maintained by the clock 108a for the TSN 102 to the TSN node 104b. The TSN node 104b operates in a clock follower role 1604. In the clock follower role 1604, the TSN node 104b receives messages 112 with time information 418 representing a network time for the TSN 102 from the TSN node 104a. The TSN node 104b may update the clock 108b based on the time information 418 carried by the messages 112, in order for the clocks 108a, 108b to become synchronized.

As depicted in FIG. 16, the TSN nodes 104a, 104b may include IDS 110a, 110b, respectively. Prior to the TSN node 104a sending the messages 112 to the TSN node 104b, the IDS 110a of the TSN node 104a may inspect the messages 112 for indicia of a security attack. Similarly, the IDS 110b of the TSN node 104b may receive the messages 112 sent from the TSN node 104a, and inspect the message messages 112 for indicia of a security attack.

Assume an attacker initiates a sub-150 nanosecond attack. In order to deal with attacks having less than 150 nanoseconds/synchronization cycle time offset bias attacks, the IDS 110 may implement an offset crosscheck technique with E2E authenticated TLV. End-to-end path delay and time offset computation can be requested alongside PTP running in the (more accurate) peer-to-peer mode. The TSN node 104b may send a crosscheck request 1606 to the TSN node 104a. The crosscheck request 1606 may comprise a request message for an E2E path delay and time offset computation from the TSN node 104a. The TSN node 104a may send a crosscheck response 1608 to a received crosscheck request 1606. The crosscheck response 1608 may comprise a response message with the requested E2E path delay and time offset computation from the TSN node 104a.

The crosscheck request 1606 and the crosscheck response 1608 may be communicate in accordance with a TLV protocol to ensure messages are protected and prevent message content tampering along a network path. Within communication protocols, TLV is an encoding scheme used for optional informational elements in a certain protocol. A TLV-encoded data stream contains code related to the record type, the record value's length, and finally the value itself. The type and length are fixed in size (typically 1-4 bytes), and the value field is of variable size. The type field is a binary code, often simply alphanumeric, which indicates the kind of field that this part of the message represents. The length field is a size of the value field (typically in bytes). The value field is a variable-sized series of bytes which contains data for this part of the message. Examples of TLV protocols suitable for the IDS 110 may include transport layer security (TLS) protocol, secure shell (SSH) protocol, common open policy service (COPS) protocol, and so forth. Embodiments are not limited in this context.

The TSN 102 may implement, for example, PTP in a P2P mode. The IDS 110 may request crosscheck information 616 alongside PTP operating in a P2P mode, using an AuthTLV-based E2E offset crosscheck technique.

Figure 17:
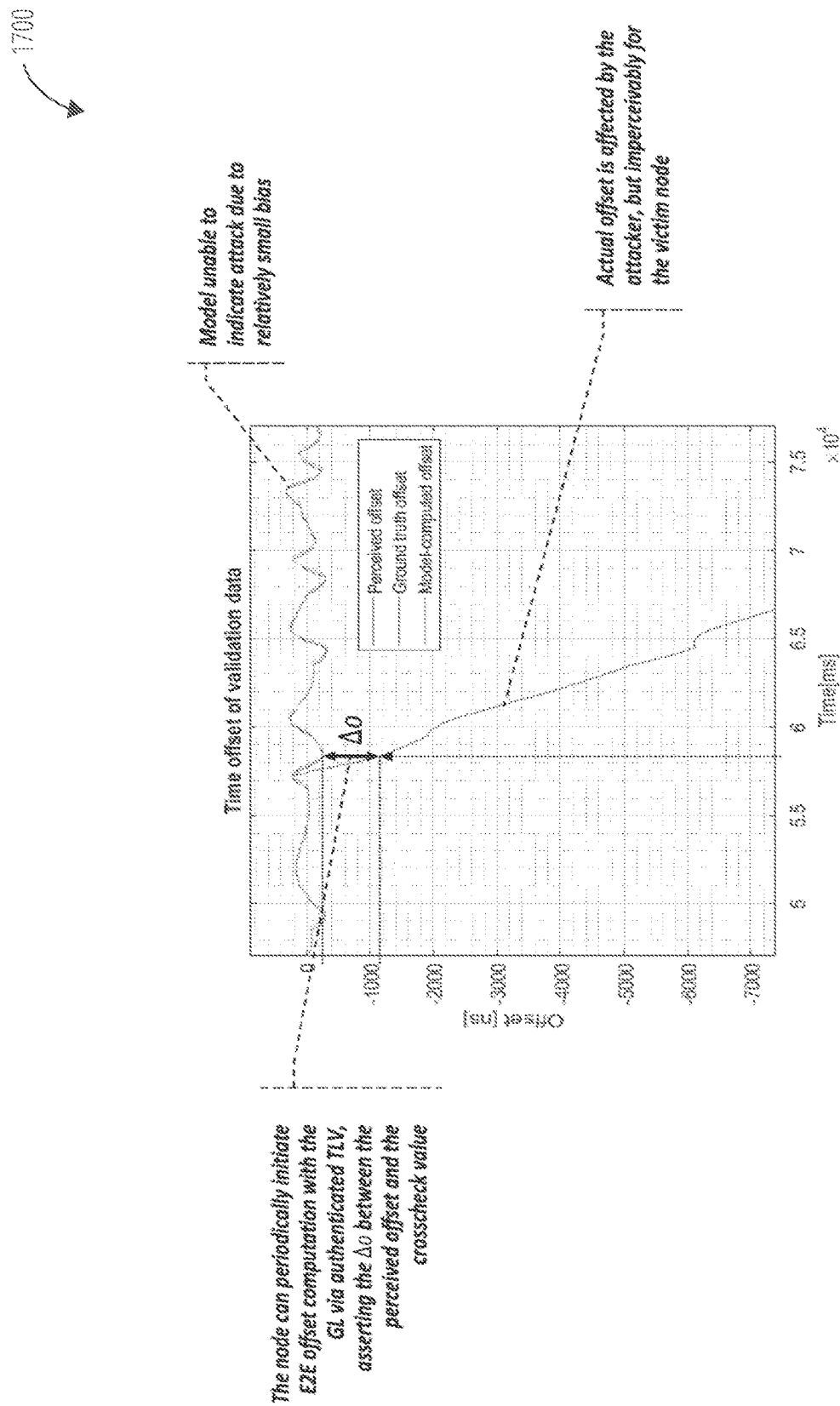
FIG. 17 illustrates a graph 1700 in accordance with one embodiment.

FIG. 17 illustrates a graph 1700 representing time offset of validation data. The graph 1700 illustrates an x-axis of time in milliseconds, and a y-axis of time offset in nanoseconds. As previously discussed, the TSN system model 604 may have difficulty detecting a sub-150 nanosecond attack due to the relatively smaller time offset bias. However, a victim node such as TSN node 104b may still be affected by an accumulation of the smaller time offset bias. To account for this type of attack, the IDS 110 may implement a time offset crosscheck with an E2E authenticated TLV protocol. The TSN node 104b can periodically initiate an E2E offset computation with the TSN node 104a via authenticated TLV, asserting the 40 between a perceived time offset and a crosscheck value. If $\Delta o^-$ is a maximum tolerable offset, and $\underline{o}^{IDS}$ is a minimum detectable attack rate, then $\underline{T}^{occ} = (\Delta o^-)/\underline{o}^{IDS}$ is a minimum periodicity of offset crosscheck measurements.

It is worthy to note that the IDS 110 and the TSN system model 604 may be implemented for any type of TSN 102, including wired and wireless networks. Further, while IEEE 802.1AS is taken as a running example but the analysis can be applied to other protocols (e.g., IEEE 1588). Finally, it is assumed that an attack is not tampering with message propagation (e.g., drops/delays) or with the leader/follower platforms.

Figure 18:
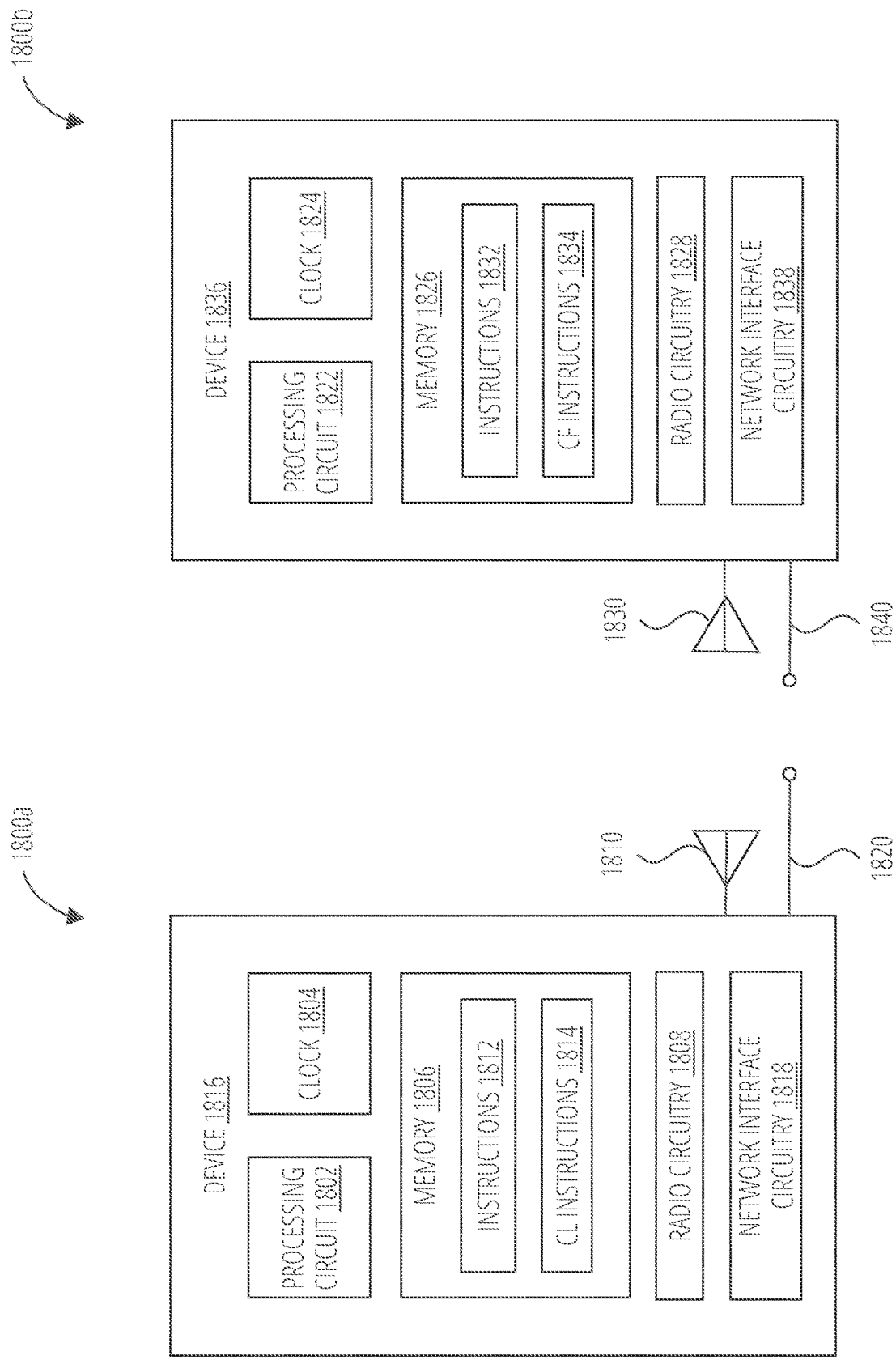
FIG. 18A illustrates an aspect of a clock leader (CL) 1800a in accordance with one embodiment.
FIG. 18B illustrates an aspect of a clock follower (CF) 1800b in accordance with one embodiment.

FIG. 18A depicts a device 1816. The device 1816 could be a network node or one of the switches in a TSN network (e.g., TSN nodes 104, clock leader node 202, relay nodes 204a-c, clock follower node 206, relay node 302, TSN nodes 104, system 600, system 700, system 1600, or apparatus 500). Device 1816 includes a processing circuit 1802, a clock 1804, memory 1806, radio circuitry 1808, an antenna 1810, a network interface circuitry 1818, and a wired connection 1820. Memory 1806 stores instructions 1812 and CL instructions 1814. During operation, processing circuit 1802 can execute instructions 1812 and/or CL instructions 1814 to cause device 1816 to send timing messages as a clock leader or grand clock leader (e.g., from time measurements from a global clock for a TSN network) to other devices in the TSN network. In some examples, processing circuit 1802 can execute instructions 1812 and/or CL instructions 1814 to cause device 1816 to send time synchronization messages, time update messages, and other timing messages defined by various IEEE standards as discussed herein. Furthermore, processing circuit 1802 can execute instructions 1812 to cause device 1816 to send, via radio circuitry 1808 and antenna 1810 or network interface circuitry 1818 timing messages as the CL for a CF in a TSN network.

FIG. 18B depicts a device 1836. The device 1836 could be one of the network nodes or switches in a TSN network (e.g., TSN nodes 104, clock leader node 202, relay nodes 204a-c, clock follower node 206, relay node 302, TSN nodes 104, system 600, system 700, system 1600, or apparatus 500). Device 1836 includes a processing circuit 1822, a clock 1824, memory 1826, radio circuitry 1828, an antenna 1830, a network interface circuitry 1838, and a wired connection 1840. Memory 1826 stores instructions 1832 and CF instructions 1834. During operation, processing circuit 1822 can execute instructions 1832 and/or CF instructions 1834 to cause device 1836 to receive timing messages as a clock follower (e.g., from time measurements from a global clock for a TSN network) from other devices in the TSN network, such as the device 1816. In some examples, processing circuit 1822 can execute instructions 1832 and/or CF instructions 1834 to cause device 1836 to receive time synchronization messages, time update messages, and other timing messages defined by various IEEE standards as discussed herein. Furthermore, processing circuit 1822 can execute instructions 1832 and/or CF instructions 1834 to cause device 1836 to receive, via radio circuitry 1828 and antenna 1830 or network interface circuitry 1838 timing messages as the CF for a CL in a TSN network. In addition, processing circuit 1822 can execute instructions 1832 and/or CF instructions 1834 to cause device 1836 to send, via radio circuitry 1828 and antenna 1830 or network interface circuitry 1838 security messages in response to a security attack, such as alert messages, notification messages, network reconfiguration messages, device isolation messages, model update messages, and other messages in a TSN network.

Figure 19:
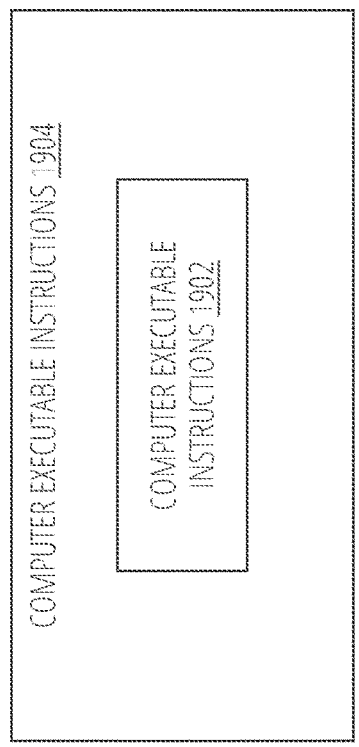
FIG. 19 illustrates an aspect of a computer-readable medium 1900 in accordance with one embodiment.

FIG. 19 illustrates computer-readable storage computer-readable medium 1900. Computer-readable storage computer-readable medium 1900 may comprise any non-transitory computer-readable storage medium or machine-readable storage medium, such as an optical, magnetic or semiconductor storage medium. In various embodiments, computer-readable storage computer-readable medium 1900 may comprise an article of manufacture. In some embodiments, computer-readable storage computer-readable medium 1900 may store computer executable instructions 1902 with which circuitry (e.g., processing circuitry 414, processing circuit 1802, processing circuit 1822, radio circuitry 1808, radio circuitry 1828, network interface circuitry 1818, network interface circuitry 1838, clock manager 106, clock circuitry 412, or the like) can execute. For example, computer executable instructions 1902 can include instructions to implement operations described with respect to logic flows 1900 and 2000. Examples of computer-readable storage computer-readable medium 1900 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1902 may include any suitable type of code, such as source code, compiled code, interpreted code, executable code, static code, dynamic code, object-oriented code, visual code, and the like.

The following aspects and examples pertain to further embodiments, from which numerous permutations and configurations will be apparent.

One example method includes receiving a message with time information from a first device operating as a clock leader by a second device operating as a clock follower in a time-synchronized network (TSN), the time information to include information to synchronize a first clock for the first device and a second clock for the second device to a network time for the TSN maintained by the first clock, retrieving an actual time offset value for the message, the actual time offset value to comprise a value representing a time between an actual sending time and an actual receiving time of the message, retrieving an estimated time offset value for the message, the estimated time offset value to comprise a value representing a time between an estimated sending time and an estimated receiving time of the message, the estimated time offset value generated using a physics-aware model of the TSN and a clock adjustment value for the second clock based on the time information, generating difference information between the actual time offset value and the estimated time offset value for the message, and determining whether the time information for the message has been modified to cause the first clock and the second clock to desynchronize based on the difference information.

The example method may also include generating the actual time offset value for the message based on a sending timestamp for the actual sending time of the message carried by the message.

The example method may also include generating the actual time offset value for the message based on a sending timestamp for the actual sending time of the message carried by another message.

The example method may also include retrieving a sending timestamp to indicate the actual sending time of the message, retrieving a network delay value to indicate an actual amount of time delay incurred by the message as it traversed one or more TSN nodes in the TSN, retrieving a receiving timestamp to indicate the actual receiving time of the message, and generating the actual time offset value for the message as a value between the sending timestamp and the receiving timestamp minus the network delay value.

The example method may also include storing the actual time offset value in a data storage device.

The example method may also include generating a clock adjustment for the second clock, the clock adjustment to adjust the second clock of the second device to synchronize the second clock to the network time of the first clock.

The example method may also include generating a clock adjustment for the second clock, the clock adjustment to adjust the second clock of the second device to synchronize the second clock to the network time of the first clock, where the clock adjustment includes a frequency adjustment to adjust a frequency of the second clock.

The example method may also include generating a clock adjustment for the second clock based on the time information carried by the message, the clock adjustment to adjust the second clock of the second device to synchronize the second clock to the network time of the first clock.

The example method may also include generating a clock adjustment for the second clock based on time information carried by another message, the clock adjustment to adjust the second clock of the second device to synchronize the second clock to the network time of the first clock.

The example method may also include generating the estimated time offset value for the message using the physics-aware model of the TSN based on a clock adjustment for the second clock, the clock adjustment to adjust the second clock of the second device to synchronize the second clock to the network time of the first clock.

The example method may also include generating an estimated sending time of the message, generating an estimated network delay value to indicate an estimated amount of time delay incurred by the message as it traversed one or more TSN nodes in the TSN, generating an estimated receiving time of the message, and generating the estimated time offset value for the message as a value between the estimated sending time and the estimated receiving time minus the estimated network delay value.

The example method may also include storing the estimated time offset value in a data storage device.

The example method may also include where the physics-aware model of the TSN is based on a model of a time synchronization process for the TSN as a closed loop control system, the model to mathematically characterize time offset values as a function of clock adjustments, where the time offset values are controlled variables and the clock adjustments are excitation inputs, in order to produce the model as a controlled process or plant model of the TSN.

The example method may also include receiving a set of actual time offset values indicating actual amounts of time delays incurred by messages as the messages traverse one or more TSN nodes of the TSN during normal operations of the TSN, identifying the physics-aware model of the TSN based on the set of actual time offset values.

The example method may also include identifying the physics-aware model of the TSN for a defined time interval as measured between an initial set of unknown conditions for the TSN and when the TSN reaches a steady state as indicated by a standard deviation of time offset values.

The example method may also include identifying the physics-aware model of the TSN for a defined time interval as measured between an initial set of unknown conditions for the TSN and when the TSN reaches a steady state as indicated by a standard deviation of time offset values, where the defined time interval is less than or equal to 5 seconds, and where the standard deviation of time offset values is less than or equal to 150 nanoseconds.

The example method may also include performing a handshake protocol between the first device and the second device to reduce an identifying time for the physics-aware model of the TSN.

The example method may also include identifying the physics-aware model of the TSN based on one or more dynamical properties of the TSN, where one of the dynamical properties of a clock synchronization process for the TSN is bounded-input-bounded-output (BIBO) instability, where a bounded input does not always produce a bounded output, the bounded input to comprise a clock adjustment to the second clock, and the bounded output to comprise a time offset value for a message.

The example method may also include identifying the physics-aware model of the TSN based on one or more dynamical properties of the TSN, where one of the dynamical properties of a clock synchronization process for the TSN is a homogeneous or unforced response featuring an increasing component.

The method may also include identifying the physics-aware model of the TSN based on one or more dynamical properties of the TSN, where one of the dynamical properties of a clock synchronization process for the TSN is a presence of an overshoot of a time offset value in a closed-loop clock convergence phase due to a transient.

The example method may also include identifying the physics-aware model of the TSN based on one or more dynamical properties of the TSN, where one of the dynamical properties of a clock synchronization process for the TSN is a presence of a higher order oscillatory behavior.

The example method may also include determining a transfer function from an input of a clock adjustment to an output of a time offset value based on data collected from a set of nominal or benign runs of messages communicated within the TSN.

The method may also include determining whether the time information for the second message has been modified to cause the first clock and the second clock to desynchronize based on the residual value, where the residual value is a value greater than 150 nanoseconds.

The example method may also include requesting information from the first device by the second device to cross-check one or more estimated time offset values generated by the physics-aware model of the TSN using an authenticated type-length-value (TLV) communications protocol between the first device and the second device, the TLV to prevent tampering with message content of a message communicated between the first device and the second device.

The example method may also include generating an alert of a security attack within the TSN when the time information for the second message has been determined to be modified to cause the first clock and the second clock to desynchronize based on the difference information. Other technical features may be readily apparent to one skilled in the art from the following figures, descriptions, and claims.

An example computing apparatus includes a processor circuitry. The example computing apparatus also includes a memory communicatively coupled to the processor circuitry, the memory storing instructions that, when executed by the processor circuitry, cause the processor circuitry to receive a message with time information from a first device operating as a clock leader by a second device operating as a clock follower in a time-synchronized network (TSN), the time information to include information to synchronize a first clock for the first device and a second clock for the second device to a network time for the TSN maintained by the first clock, retrieve an actual time offset value for the message, the actual time offset value to comprise a value representing a time between an actual sending time and an actual receiving time of the message, retrieve an estimated time offset value for the message, the estimated time offset value to comprise a value representing a time between an estimated sending time and an estimated receiving time of the message, the estimated time offset value generated using a physics-aware model of the TSN and a clock adjustment value for the second clock based on the time information, generate difference information between the actual time offset value and the estimated time offset value for the message, and determine whether the time information for the message has been modified to cause the first clock and the second clock to desynchronize based on the difference information.

The example computing apparatus may also include generate the actual time offset value for the message based on a sending timestamp for the actual sending time of the message carried by the message.

The example computing apparatus may also include generate the actual time offset value for the message based on a sending timestamp for the actual sending time of the message carried by another message.

The example computing apparatus may also include retrieve a sending timestamp to indicate the actual sending time of the message, retrieve a network delay value to indicate an actual amount of time delay incurred by the message as it traversed one or more TSN nodes in the TSN, retrieve a receiving timestamp to indicate the actual receiving time of the message, and generate the actual time offset value for the message as a value between the sending timestamp and the receiving timestamp minus the network delay value.

The example computing apparatus may also include store the actual time offset value in a data storage device.

The example computing apparatus may also include generate a clock adjustment for the second clock, the clock adjustment to adjust the second clock of the second device to synchronize the second clock to the network time of the first clock.

The example computing apparatus may also include generate a clock adjustment for the second clock, the clock adjustment to adjust the second clock of the second device to synchronize the second clock to the network time of the first clock, where the clock adjustment includes a frequency adjustment to adjust a frequency of the second clock.

The example computing apparatus may also include generate a clock adjustment for the second clock based on the time information carried by the message, the clock adjustment to adjust the second clock of the second device to synchronize the second clock to the network time of the first clock.

The example computing apparatus may also include generate a clock adjustment for the second clock based on time information carried by another message, the clock adjustment to adjust the second clock of the second device to synchronize the second clock to the network time of the first clock.

The example computing apparatus may also include generate the estimated time offset value for the message using the physics-aware model of the TSN based on a clock adjustment for the second clock, the clock adjustment to adjust the second clock of the second device to synchronize the second clock to the network time of the first clock.

The example computing apparatus may also include generate an estimated sending time of the message, generate an estimated network delay value to indicate an estimated amount of time delay incurred by the message as it traversed one or more TSN nodes in the TSN, generate an estimated receiving time of the message, and generate the estimated time offset value for the message as a value between the estimated sending time and the estimated receiving time minus the estimated network delay value.

The example computing apparatus may also include store the estimated time offset value in a data storage device.

The example computing apparatus may also include where the physics-aware model of the TSN is based on a model of a time synchronization process for the TSN as a closed loop control system, the model to mathematically characterize time offset values as a function of clock adjustments, where the time offset values are controlled variables and the clock adjustments are excitation inputs, in order to produce the model as a controlled process or plant model of the TSN.

The example computing apparatus may also include receive a set of actual time offset values indicating actual amounts of time delays incurred by messages as the messages traverse one or more TSN nodes of the TSN during normal operations of the TSN, identify the physics-aware model of the TSN based on the set of actual time offset values.

The example computing apparatus may also include identify the physics-aware model of the TSN for a defined time interval as measured between an initial set of unknown conditions for the TSN and when the TSN reaches a steady state as indicated by a standard deviation of time offset values.

The example computing apparatus may also include identify the physics-aware model of the TSN for a defined time interval as measured between an initial set of unknown conditions for the TSN and when the TSN reaches a steady state as indicated by a standard deviation of time offset values, where the defined time interval is less than or equal to 5 seconds, and where the standard deviation of time offset values is less than or equal to 150 nanoseconds.

The example computing apparatus may also include perform a handshake protocol between the first device and the second device to reduce an identifying time for the physics-aware model of the TSN.

The example computing apparatus may also include identify the physics-aware model of the TSN based on one or more dynamical properties of the TSN, where one of the dynamical properties of a clock synchronization process for the TSN is bounded-input-bounded-output (BIBO) instability, where a bounded input does not always produce a bounded output, the bounded input to comprise a clock adjustment to the second clock, and the bounded output to comprise a time offset value for a message.

The example computing apparatus may also include identify the physics-aware model of the TSN based on one or more dynamical properties of the TSN, where one of the dynamical properties of a clock synchronization process for the TSN is a homogeneous or unforced response featuring an increasing component.

The example computing apparatus may also include identify the physics-aware model of the TSN based on one or more dynamical properties of the TSN, where one of the dynamical properties of a clock synchronization process for the TSN is a presence of an overshoot of a time offset value in a closed-loop clock convergence phase due to a transient.

The example computing apparatus may also include identify the physics-aware model of the TSN based on one or more dynamical properties of the TSN, where one of the dynamical properties of a clock synchronization process for the TSN is a presence of a higher order oscillatory behavior.

The example computing apparatus may also include determine a transfer function from an input of a clock adjustment to an output of a time offset value based on data collected from a set of nominal or benign runs of messages communicated within the TSN.

The example computing apparatus may also include determine whether the time information for the second message has been modified to cause the first clock and the second clock to desynchronize based on the residual value, where the residual value is a value greater than 150 nanoseconds.

The example computing apparatus may also include request information from the first device by the second device to crosscheck one or more estimated time offset values generated by the physics-aware model of the TSN using an authenticated type-length-value (TLV) communications protocol between the first device and the second device, the TLV to prevent tampering with message content of a message communicated between the first device and the second device.

The example computing apparatus may also include generate an alert of a security attack within the TSN when the time information for the second message has been determined to be modified to cause the first clock and the second clock to desynchronize based on the difference information. Other technical features may be readily apparent to one skilled in the art from the following figures, descriptions, and claims.

An example non-transitory computer-readable storage medium, the example computer-readable storage medium including instructions that when executed by a computer, cause the computer to receive a message with time information from a first device operating as a clock leader by a second device operating as a clock follower in a time-synchronized network (TSN), the time information to include information to synchronize a first clock for the first device and a second clock for the second device to a network time for the TSN maintained by the first clock, retrieve an actual time offset value for the message, the actual time offset value to comprise a value representing a time between an actual sending time and an actual receiving time of the message, retrieve an estimated time offset value for the message, the estimated time offset value to comprise a value representing a time between an estimated sending time and an estimated receiving time of the message, the estimated time offset value generated using a physics-aware model of the TSN and a clock adjustment value for the second clock based on the time information, generate difference information between the actual time offset value and the estimated time offset value for the message, and determine whether the time information for the message has been modified to cause the first clock and the second clock to desynchronize based on the difference information.

The example computer-readable storage medium may also include generate the actual time offset value for the message based on a sending timestamp for the actual sending time of the message carried by the message.

The example computer-readable storage medium may also include generate the actual time offset value for the message based on a sending timestamp for the actual sending time of the message carried by another message.

The example computer-readable storage medium may also include retrieve a sending timestamp to indicate the actual sending time of the message, retrieve a network delay value to indicate an actual amount of time delay incurred by the message as it traversed one or more TSN nodes in the TSN, retrieve a receiving timestamp to indicate the actual receiving time of the message, and generate the actual time offset value for the message as a value between the sending timestamp and the receiving timestamp minus the network delay value.

The example computer-readable storage medium may also include store the actual time offset value in a data storage device.

The example computer-readable storage medium may also include generate a clock adjustment for the second clock, the clock adjustment to adjust the second clock of the second device to synchronize the second clock to the network time of the first clock.

The example computer-readable storage medium may also include generate a clock adjustment for the second clock, the clock adjustment to adjust the second clock of the second device to synchronize the second clock to the network time of the first clock, where the clock adjustment includes a frequency adjustment to adjust a frequency of the second clock.

The example computer-readable storage medium may also include generate a clock adjustment for the second clock based on the time information carried by the message, the clock adjustment to adjust the second clock of the second device to synchronize the second clock to the network time of the first clock.

The example computer-readable storage medium may also include generate a clock adjustment for the second clock based on time information carried by another message, the clock adjustment to adjust the second clock of the second device to synchronize the second clock to the network time of the first clock.

The example computer-readable storage medium may also include generate the estimated time offset value for the message using the physics-aware model of the TSN based on a clock adjustment for the second clock, the clock adjustment to adjust the second clock of the second device to synchronize the second clock to the network time of the first clock.

The example computer-readable storage medium may also include generate an estimated sending time of the message, generate an estimated network delay value to indicate an estimated amount of time delay incurred by the message as it traversed one or more TSN nodes in the TSN, generate an estimated receiving time of the message, and generate the estimated time offset value for the message as a value between the estimated sending time and the estimated receiving time minus the estimated network delay value.

The example computer-readable storage medium may also include store the estimated time offset value in a data storage device.

The example computer-readable storage medium may also include where the physics-aware model of the TSN is based on a model of a time synchronization process for the TSN as a closed loop control system, the model to mathematically characterize time offset values as a function of clock adjustments, where the time offset values are controlled variables and the clock adjustments are excitation inputs, in order to produce the model as a controlled process or plant model of the TSN.

The example computer-readable storage medium may also include receive a set of actual time offset values indicating actual amounts of time delays incurred by messages as the messages traverse one or more TSN nodes of the TSN during normal operations of the TSN, identify the physics-aware model of the TSN based on the set of actual time offset values.

The example computer-readable storage medium may also include identify the physics-aware model of the TSN for a defined time interval as measured between an initial set of unknown conditions for the TSN and when the TSN reaches a steady state as indicated by a standard deviation of time offset values.

The example computer-readable storage medium may also include identify the physics-aware model of the TSN for a defined time interval as measured between an initial set of unknown conditions for the TSN and when the TSN reaches a steady state as indicated by a standard deviation of time offset values, where the defined time interval is less than or equal to 5 seconds, and where the standard deviation of time offset values is less than or equal to 150 nanoseconds.

The example computer-readable storage medium may also include perform a handshake protocol between the first device and the second device to reduce an identifying time for the physics-aware model of the TSN.

The example computer-readable storage medium may also include identify the physics-aware model of the TSN based on one or more dynamical properties of the TSN, where one of the dynamical properties of a clock synchronization process for the TSN is bounded-input-bounded-output (BIBO) instability, where a bounded input does not always produce a bounded output, the bounded input to comprise a clock adjustment to the second clock, and the bounded output to comprise a time offset value for a message.

The example computer-readable storage medium may also include identify the physics-aware model of the TSN based on one or more dynamical properties of the TSN, where one of the dynamical properties of a clock synchronization process for the TSN is a homogeneous or unforced response featuring an increasing component.

The example computer-readable storage medium may also include identify the physics-aware model of the TSN based on one or more dynamical properties of the TSN, where one of the dynamical properties of a clock synchronization process for the TSN is a presence of an overshoot of a time offset value in a closed-loop clock convergence phase due to a transient.

The example computer-readable storage medium may also include identify the physics-aware model of the TSN based on one or more dynamical properties of the TSN, where one of the dynamical properties of a clock synchronization process for the TSN is a presence of a higher order oscillatory behavior.

The example computer-readable storage medium may also include determine a transfer function from an input of a clock adjustment to an output of a time offset value based on data collected from a set of nominal or benign runs of messages communicated within the TSN.

The example computer-readable storage medium may also include determine whether the time information for the second message has been modified to cause the first clock and the second clock to desynchronize based on the residual value, where the residual value is a value greater than 150 nanoseconds.

The example computer-readable storage medium may also include request information from the first device by the second device to crosscheck one or more estimated time offset values generated by the physics-aware model of the TSN using an authenticated type-length-value (TLV) communications protocol between the first device and the second device, the TLV to prevent tampering with message content of a message communicated between the first device and the second device.

The example computer-readable storage medium may also include generate an alert of a security attack within the TSN when the time information for the second message has been determined to be modified to cause the first clock and the second clock to desynchronize based on the difference information.

It may be appreciated that any of the example method, apparatus and computer-readable storage medium may be implemented as example systems and/or with means plus function components. Other technical features may be readily apparent to one skilled in the art from the following figures, descriptions, and claims.

What is claimed is:

1. A method, comprising:
   receiving a message with time information from a first device operating as a clock leader by a second device operating as a clock follower in a time-synchronized network (TSN), the time information to include information to synchronize a first clock for the first device and a second clock for the second device to a network time for the TSN maintained by the first clock;
   retrieving an actual time offset value for the message from a model;
   retrieving an estimated time offset value for the message, the estimated time offset value comprising a value between an estimated sending time and an estimated receiving time of the message generated by a time offset estimator of the second device;
   generating difference information between the actual time offset value and the estimated time offset value for the message; and
   determining whether the time information for the message has been modified to cause the first clock and the second clock to desynchronize when the difference information is greater than or equal to a defined threshold value.

2. The method of claim 1, wherein the actual time offset value to comprise a value representing a time between an actual sending time and an actual receiving time of the message, and the estimated time offset value to comprise a value representing a time between an estimated sending time and an estimated receiving time of the message, the estimated time offset value generated using a physics-aware model of the TSN and a clock adjustment value for the second clock based on the time information.

3. The method of claim 1, comprising generating the actual time offset value for the message based on a sending timestamp for the actual sending time of the message carried by the message or another message.

4. The method of claim 1, comprising:
   retrieving a sending timestamp to indicate the actual sending time of the message;
   retrieving a network delay value to indicate an actual amount of time delay incurred by the message as it traversed one or more TSN nodes in the TSN;
   retrieving a receiving timestamp to indicate the actual receiving time of the message; and
   generating the actual time offset value for the message as a value between the sending timestamp and the receiving timestamp minus the network delay value.

5. The method of claim 1, comprising storing the actual time offset value in a data storage device.

6. The method of claim 1, comprising generating a clock adjustment for the second clock, the clock adjustment to adjust the second clock of the second device to synchronize the second clock to the network time of the first clock.

7. The method of claim 1, comprising generating a clock adjustment for the second clock, the clock adjustment to adjust the second clock of the second device to synchronize the second clock to the network time of the first clock, wherein the clock adjustment comprises a frequency adjustment to adjust a frequency of the second clock.

8. The method of claim 1, comprising generating a clock adjustment for the second clock based on the time information carried by the message, the clock adjustment to adjust the second clock of the second device to synchronize the second clock to the network time of the first clock.

9. The method of claim 1, comprising generating a clock adjustment for the second clock based on time information carried by another message, the clock adjustment to adjust the second clock of the second device to synchronize the second clock to the network time of the first clock.

10. The method of claim 1, comprising generating the estimated time offset value for the message using the physics-aware model of the TSN based on a clock adjustment for the second clock, the clock adjustment to adjust the second clock of the second device to synchronize the second clock to the network time of the first clock.

11. A computing apparatus comprising:
    a processor circuitry; and
    a memory communicatively coupled to the processor circuitry, the memory storing instructions that, when executed by the processor circuitry, cause the processor circuitry to:
      receive a message with time information from a first device operating as a clock leader by a second device operating as a clock follower in a time-synchronized network (TSN), the time information to include information to synchronize a first clock for the first device and a second clock for the second device to a network time for the TSN maintained by the first clock;
      retrieve an actual time offset value for the message;
      retrieve an estimated time offset value for the message from a model, the estimated time offset value comprising a value between an estimated sending time and an estimated receiving time of the message generated by a time offset estimator of the second device;
      generate difference information between the actual time offset value and the estimated time offset value for the message; and
      determine whether the time information for the message has been modified to cause the first clock and the second clock to desynchronize when the difference information is greater than or equal to a defined threshold value.

12. The computing apparatus of claim 11, wherein the processor circuitry to generate the actual time offset value for the message based on a sending timestamp for the actual sending time of the message carried by the message.

13. The computing apparatus of claim 11, wherein the processor circuitry to generate the actual time offset value for the message based on a sending timestamp for the actual sending time of the message carried by another message.

14. The computing apparatus of claim 11, wherein the processor circuitry to:
retrieve a sending timestamp to indicate the actual sending time of the message;
retrieve a network delay value to indicate an actual amount of time delay incurred by the message as it traversed one or more TSN nodes in the TSN;
retrieve a receiving timestamp to indicate the actual receiving time of the message; and
generate the actual time offset value for the message as a value between the sending timestamp and the receiving timestamp minus the network delay value.

15. The computing apparatus of claim 11, wherein the processor circuitry to store the actual time offset value in a data storage device.

16. A non-transitory computer-readable storage medium, the computer-readable storage medium including instructions that when executed by a computer, cause the computer to:
receive a message with time information from a first device operating as a clock leader by a second device operating as a clock follower in a time-synchronized network (TSN), the time information to include information to synchronize a first clock for the first device and a second clock for the second device to a network time for the TSN maintained by the first clock;
retrieve an actual time offset value for the message;
retrieve an estimated time offset value for the message from a model, the estimated time offset value comprising a value between an estimated sending time and an estimated receiving time of the message generated by a time offset estimator of the second device;
generate difference information between the actual time offset value and the estimated time offset value for the message; and
determine whether the time information for the message has been modified to cause the first clock and the second clock to desynchronize when the difference information is greater than or equal to a defined threshold value.

17. The computer-readable storage medium of claim 16, wherein the computer to generate the actual time offset value for the message based on a sending timestamp for the actual sending time of the message carried by the message.

18. The computer-readable storage medium of claim 16, wherein the computer to generate the actual time offset value for the message based on a sending timestamp for the actual sending time of the message carried by another message.

19. The computer-readable storage medium of claim 16, wherein the computer to:
retrieve a sending timestamp to indicate the actual sending time of the message;
retrieve a network delay value to indicate an actual amount of time delay incurred by the message as it traversed one or more TSN nodes in the TSN;
retrieve a receiving timestamp to indicate the actual receiving time of the message; and
generate the actual time offset value for the message as a value between the sending timestamp and the receiving timestamp minus the network delay value.

20. The computer-readable storage medium of claim 16, wherein the computer to store the actual time offset value in a data storage device.

\* \* \* \* \*